United States Patent
Subana et al.

(10) Patent No.: US 10,110,761 B2
(45) Date of Patent: Oct. 23, 2018

(54) NON-TRANSITORY COMPUTER-READABLE RECORDING MEDIUM STORING COMPUTER-READABLE INSTRUCTIONS FOR A PRINT MEDIATION SERVER, AND PRINTER SYSTEM

(71) Applicant: Brother Kogyo Kabushiki Kaisha, Nagoya-shi, Aichi-ken (JP)

(72) Inventors: Thanasegaran Subana, Anjo (JP); Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 20 days.

(21) Appl. No.: 15/260,382

(22) Filed: Sep. 9, 2016

(65) Prior Publication Data
US 2017/0078502 A1     Mar. 16, 2017

(30) Foreign Application Priority Data
Sep. 10, 2015   (JP) ................. 2015-178732

(51) Int. Cl.
*G06F 3/12*     (2006.01)
*H04N 1/00*    (2006.01)

(52) U.S. Cl.
CPC ..... *H04N 1/00344* (2013.01); *H04N 1/00411* (2013.01); *H04N 1/00432* (2013.01); *H04N 1/00442* (2013.01); *H04N 2201/0094* (2013.01)

(58) Field of Classification Search
CPC ................................................. H04N 1/00344
See application file for complete search history.

(56) References Cited

U.S. PATENT DOCUMENTS 6,280,105 B1    8/2001   Iida
7,286,256 B2 *  10/2007  Herbert .............. H04N 1/00132
                                                        358/1.15

(Continued)

FOREIGN PATENT DOCUMENTS

CN    101159797 A    4/2008
CN    102238302 A    11/2011

(Continued)

OTHER PUBLICATIONS

Jan. 3, 2017—U.S. Final Office Action—U.S. Appl. No. 14/950,019.

(Continued)

*Primary Examiner* — King Poon
*Assistant Examiner* — Michael Burleson
(74) *Attorney, Agent, or Firm* — Banner & Witcoff, Ltd.

(57) ABSTRACT

A print mediation server may cause a printer to display M pieces of selection screens for selecting M pieces of items relating to printing, the M pieces of selection screens including a first file selection screen for selecting an image file in a storage server, and obtain M pieces of selection data indicating results which were selected in the M pieces of selection screens. The print mediation server may register first shortcut information including the M pieces of selection data in a case where a shortcut registration request is obtained and the M pieces of selection data are obtained, and supply a first print instruction to the printer by using the M pieces of selection data included in the first shortcut information so as to cause the printer to print a first image represented by a first image file which was selected in the first file selection screen file.

16 Claims, 10 Drawing Sheets

(56) References Cited

U.S. PATENT DOCUMENTS

| | | |
|---|---|---|
| 7,831,691 B2 | 11/2010 | Aoki et al. |
| 8,127,362 B2 | 2/2012 | Asahara |
| 8,638,461 B2 | 1/2014 | Kwon |
| 9,232,083 B2 | 1/2016 | Miyazawa et al. |
| 2002/0015598 A1 | 2/2002 | Maeda et al. |
| 2002/0136563 A1 | 9/2002 | Maeda et al. |
| 2003/0156479 A1* | 8/2003 | Fujiyoshi ............ G06F 3/04817 365/200 |
| 2004/0160630 A1 | 8/2004 | Iriyama et al. |
| 2005/0094787 A1 | 5/2005 | Atobe |
| 2005/0223324 A1 | 10/2005 | Tashiro |
| 2006/0103875 A1 | 5/2006 | Aoki et al. |
| 2006/0126110 A1 | 6/2006 | Ohara et al. |
| 2006/0143286 A1 | 6/2006 | Aoki et al. |
| 2007/0070460 A1 | 3/2007 | Yamada |
| 2007/0076241 A1 | 4/2007 | Okamoto |
| 2007/0136293 A1 | 6/2007 | Mizumukai |
| 2007/0171470 A1 | 7/2007 | Fujii et al. |
| 2007/0255428 A1 | 11/2007 | Nagata |
| 2008/0086778 A1 | 4/2008 | Asahara |
| 2008/0115059 A1 | 5/2008 | Sakai |
| 2010/0073714 A1 | 3/2010 | Mochizuki |
| 2010/0115268 A1 | 5/2010 | Kudo |
| 2010/0149592 A1 | 6/2010 | Yoshida |
| 2010/0238481 A1 | 9/2010 | Homma |
| 2010/0325203 A1 | 12/2010 | Park et al. |
| 2011/0002003 A1 | 1/2011 | Suwabe |
| 2011/0007351 A1 | 1/2011 | Kurumasa et al. |
| 2011/0126270 A1 | 5/2011 | Sato et al. |
| 2011/0128574 A1 | 6/2011 | Kouno |
| 2011/0188063 A1 | 8/2011 | Nuggehalli et al. |
| 2011/0222102 A1 | 9/2011 | Ito |
| 2011/0222116 A1 | 9/2011 | Tomita |
| 2011/0228311 A1 | 9/2011 | Oguma et al. |
| 2011/0261380 A1 | 10/2011 | Kwon |
| 2012/0092728 A1 | 4/2012 | Aoki et al. |
| 2012/0314245 A1 | 12/2012 | Nakashima |
| 2013/0141743 A1 | 6/2013 | Miyazawa et al. |
| 2014/0331164 A1 | 11/2014 | Enomoto et al. |
| 2016/0080601 A1 | 3/2016 | Miyazawa et al. |

FOREIGN PATENT DOCUMENTS

| | | |
|---|---|---|
| JP | 2002-354170 A | 12/2002 |
| JP | 2004-157839 A | 6/2004 |
| JP | 2005-269250 A | 9/2005 |
| JP | 2006-135693 A | 5/2006 |
| JP | 2006-157861 A | 6/2006 |
| JP | 2007-193415 A | 8/2007 |
| JP | 2013-118558 A | 6/2013 |
| JP | 2014-219734 A | 11/2014 |

OTHER PUBLICATIONS

Dec. 4, 2014—U.S. Non-Final Office Action—U.S. Appl. No. 13/705,572.
Jun. 30, 2015—U.S. Final Office Action—U.S. Appl. No. 13/705,572.
Aug. 28, 2015—U.S. Notice of Allowance—U.S. Appl. No. 13/705,572.
Jul. 27, 2016—U.S. Non-Final Office Action—U.S. Appl. No. 14/950,019.
Oct. 10, 2014—(CN) Notification of First Office Action—App 201210517878.3—Eng Tran.
Dec. 5, 2017—U.S. Notice of Allowance—U.S. Appl. No. 14/950,019.
Nov. 7, 2017—(EP) Extended Search Report—App 12195304.6.

* cited by examiner

FIG. 2

User Table 138

| Service Name | Display Name | Access Token (AT) |
|---|---|---|
| SV1 | Ken | AT1 |
| SV1 | Bob | AT2 |
| SV2 | Alice | AT3 |
| ... | ... | ... |

SCID Table 140

| SCID | SC Name | Service Name | Display Name | Function Name |
|---|---|---|---|---|
| ID1 | SC1 | SV1 | Ken | Download (DL) Print |
| ID2 | SC2 | SV1 | Ken | DL Print |
| ID3 | SC3 | SV1 | Bob | DL Media |
| ... | ... | ... | ... | ... |

SC Information Table 222

| SCID | Folder ID | File ID | Print Setting |
|---|---|---|---|
| ID1 | FDID1 | FLID1 | Quality-Fine<br>Type of Paper-Inkjet<br>Number of Colors-Color |
| ID2 | FDID2 | — | — |
| ID3 | FDID3 | FLID3 | Quality-Normal<br>Type of Paper-Plain<br>Number of Colors-Mono |
| ... | ... | ... | ... |

Storage Data Table 302

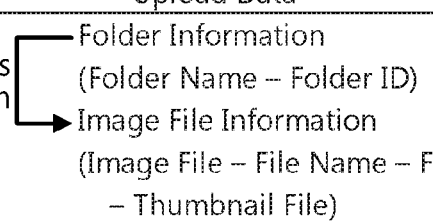

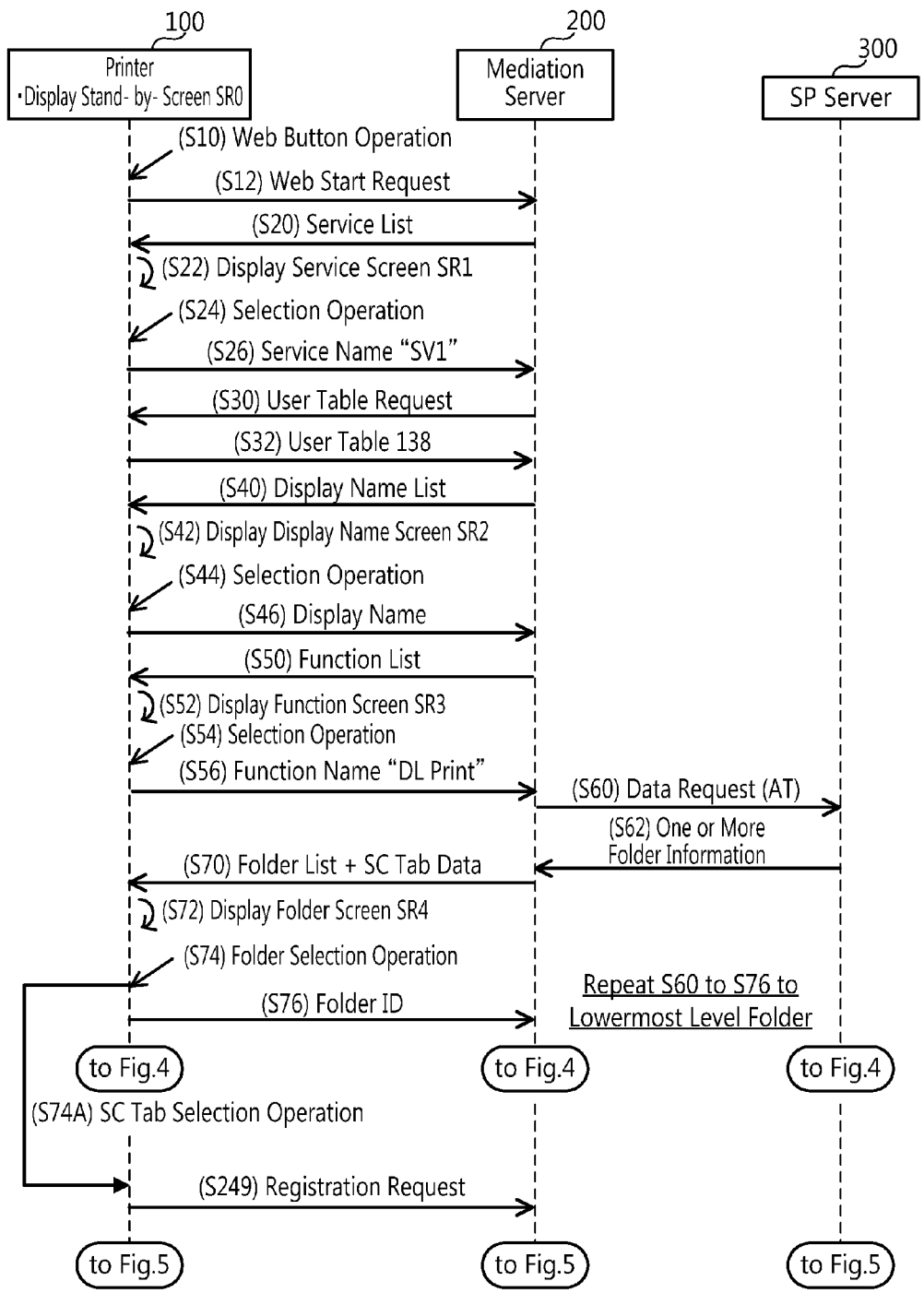

FIG. 4  (Normal DL Print; Continuation of Fig 3)
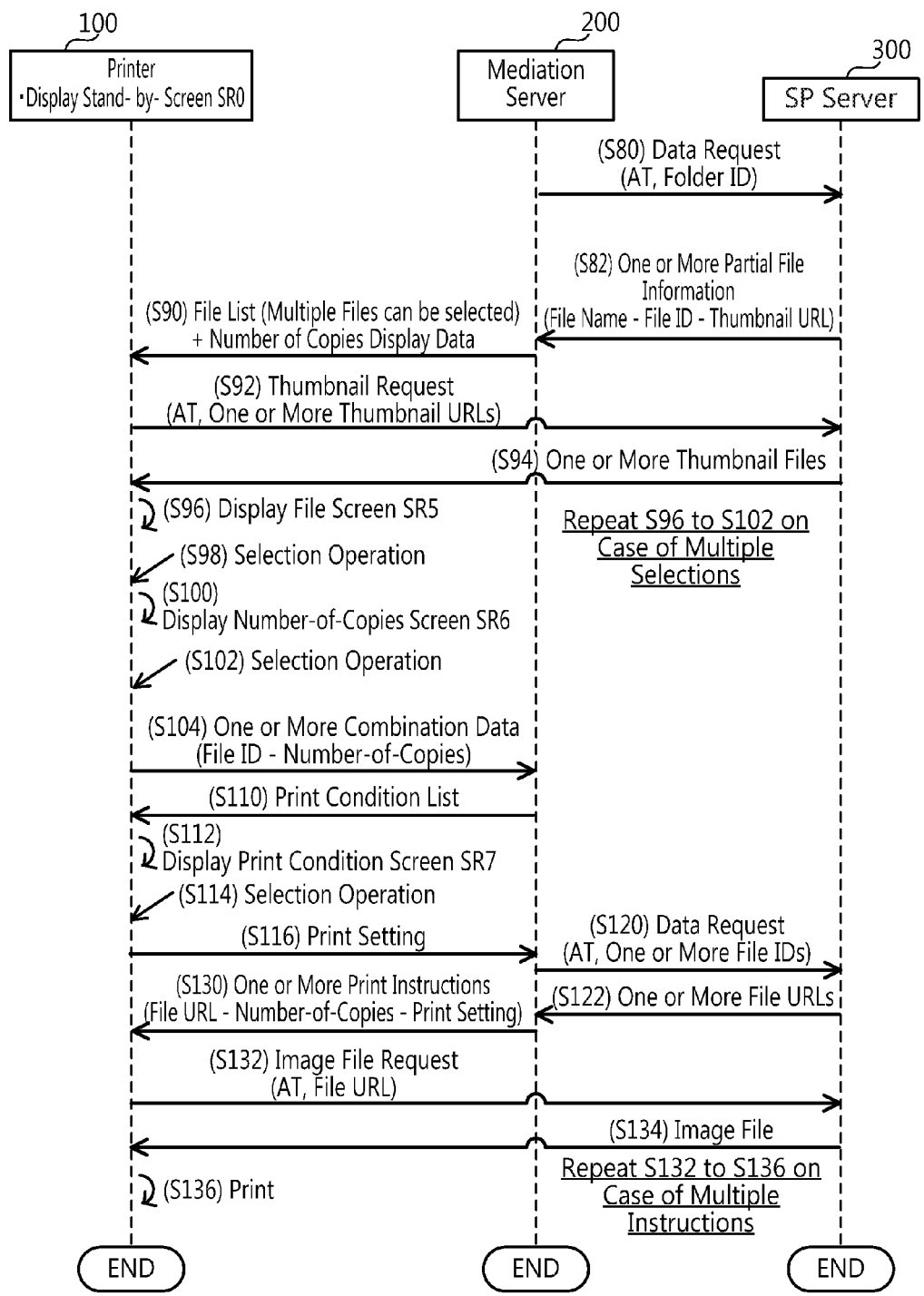

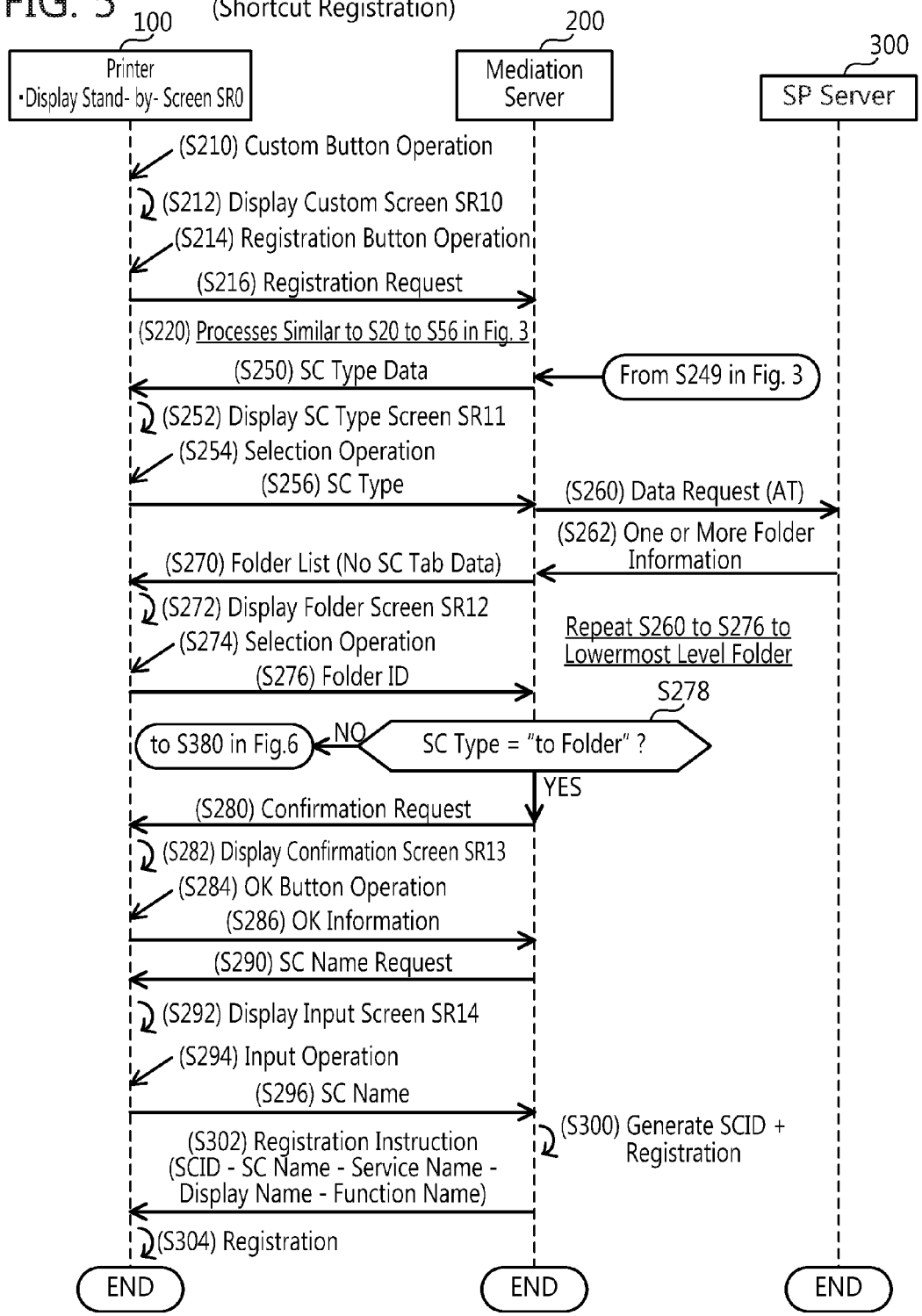

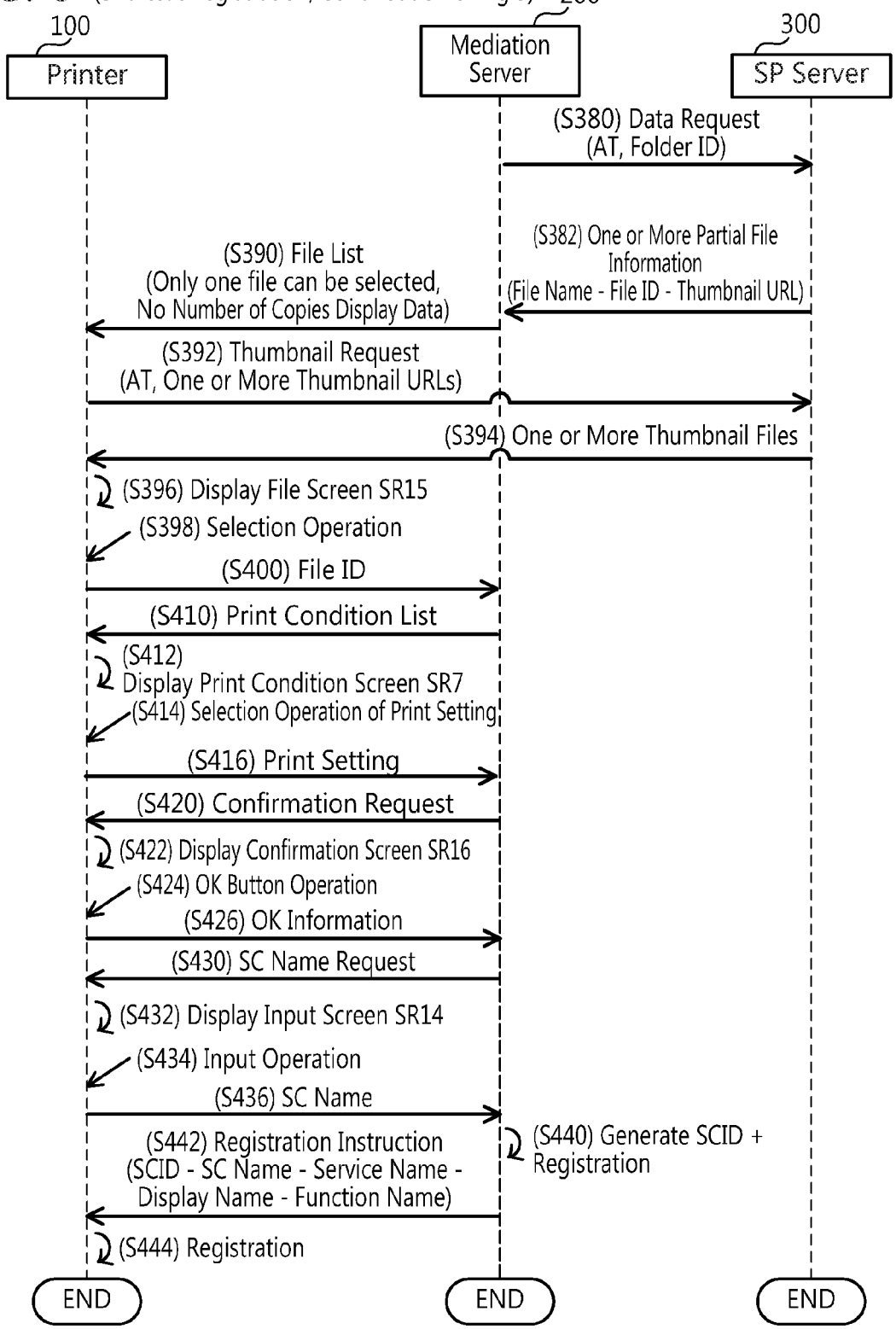

NON-TRANSITORY COMPUTER-READABLE RECORDING MEDIUM STORING COMPUTER-READABLE INSTRUCTIONS FOR A PRINT MEDIATION SERVER, AND PRINTER SYSTEM

CROSS-REFERENCE TO RELATED APPLICATION

This application claims priority to Japanese Patent Application No. 2015-178732, filed on Sep. 10, 2015, the entire contents of which are hereby incorporated by reference into the present application.

TECHNICAL FIELD

The present application discloses a technology for performing a print of an image represented by an image file stored in a storage server.

BACKGROUND ART

In general, a system including a multi-function device and a mediation server is known. In a case where an instruction for generating a shortcut is given in a state where a folder name selection screen for selecting one folder from among a plurality of folders in a service providing server, is displayed, the multi-function device stores shortcut information indicating the screen. Then, in a case where the information is selected by a user, the multi-function device supplies the information to the mediation server. In a case of obtaining the information, the mediation server supplies screen information for causing the folder name selection screen to be displayed to the multi-function device. Due to this, the multi-function device can be caused to display the folder name selection screen even without the user performing a selection operation in various screens displayed before the folder name selection screen.

SUMMARY

In the above technique, after selecting the shortcut information, the user must further perform selection of an image file in order to cause the multi-function device to print an image represented by the image file in the service providing server. A technique for improving user convenience is provided in the present specification.

A non-transitory computer-readable recording medium storing computer-readable instructions for a print mediation server, the computer-readable instructions, when executed by a processor of the print mediation server, causing the print mediation server to perform: causing a printer to display M pieces (the M being an integer of 1 or more) of selection screens for selecting M pieces of items relating to printing, the M pieces of selection screens including a first file selection screen for selecting an image file from among one or more image files stored in a storage server; obtaining M pieces of selection data indicating results which were selected in the M pieces of selection screens, the M pieces of selection data including first file selection data indicating a first image file which was selected in the first file selection screen; registering first shortcut information including the M pieces of selection data in a database in a case where a shortcut registration request is obtained from the printer and the M pieces of selection data are obtained; and supplying a first print instruction to the printer by using the M pieces of selection data included in the first shortcut information in the database so as to cause the printer to print a first image represented by the first image file in a case where a first use request indicating a use of the first shortcut information is obtained from the printer after the first shortcut information was registered in the database.

The present application may further discloses a printer system comprise: a display unit; an operation unit; a database; a print engine; a processor; and a memory configured to store computer-readable instructions therein, the computer-readable instructions, when executed by the processor, causing the printer system to perform: causing the display unit to display M pieces (the M being an integer of 1 or more) of selection screens for selecting M pieces of items relating to printing, the M pieces of selection screens including a first file selection screen for selecting an image file from among one or more image files stored in a storage server, registering shortcut information in the database, the shortcut information including M pieces of selection data indicating results which were selected via the operation unit in the M pieces of selection screens, the M pieces of selection data including first file selection data indicating a first image file which was selected in the first file selection screen; and causing the print engine to print a first image represented by the first image file by using the M pieces of selection data included in the shortcut information in the database in a case where a use operation relating to a use of the first shortcut information is performed onto the operation unit after the shortcut information was registered in the database.

A control method for implementation of the print mediation serve is also novel and useful. Moreover, the print mediation serve itself described above is also novel and useful. Moreover, a control method and computer-readable instructions for implementation of the printer system described above, and a non-transitory computer-readable recording medium in which the computer-readable instructions are stored, are also novel and useful.

BRIEF DESCRIPTION OF DRAWINGS

FIG. 2 illustrates an example of each table;

FIG. 3 illustrates a sequence chart of processes for performing a normal download print;

FIG. 4 illustrates a sequence chart for processes continuation of FIG. 3;

FIG. 5 illustrates a sequence chart of processes for registering shortcut information;

FIG. 6 illustrates a sequence chart of processes continuation of FIG. 5;

EMBODIMENTS (Configuration of System)

Figure 1:
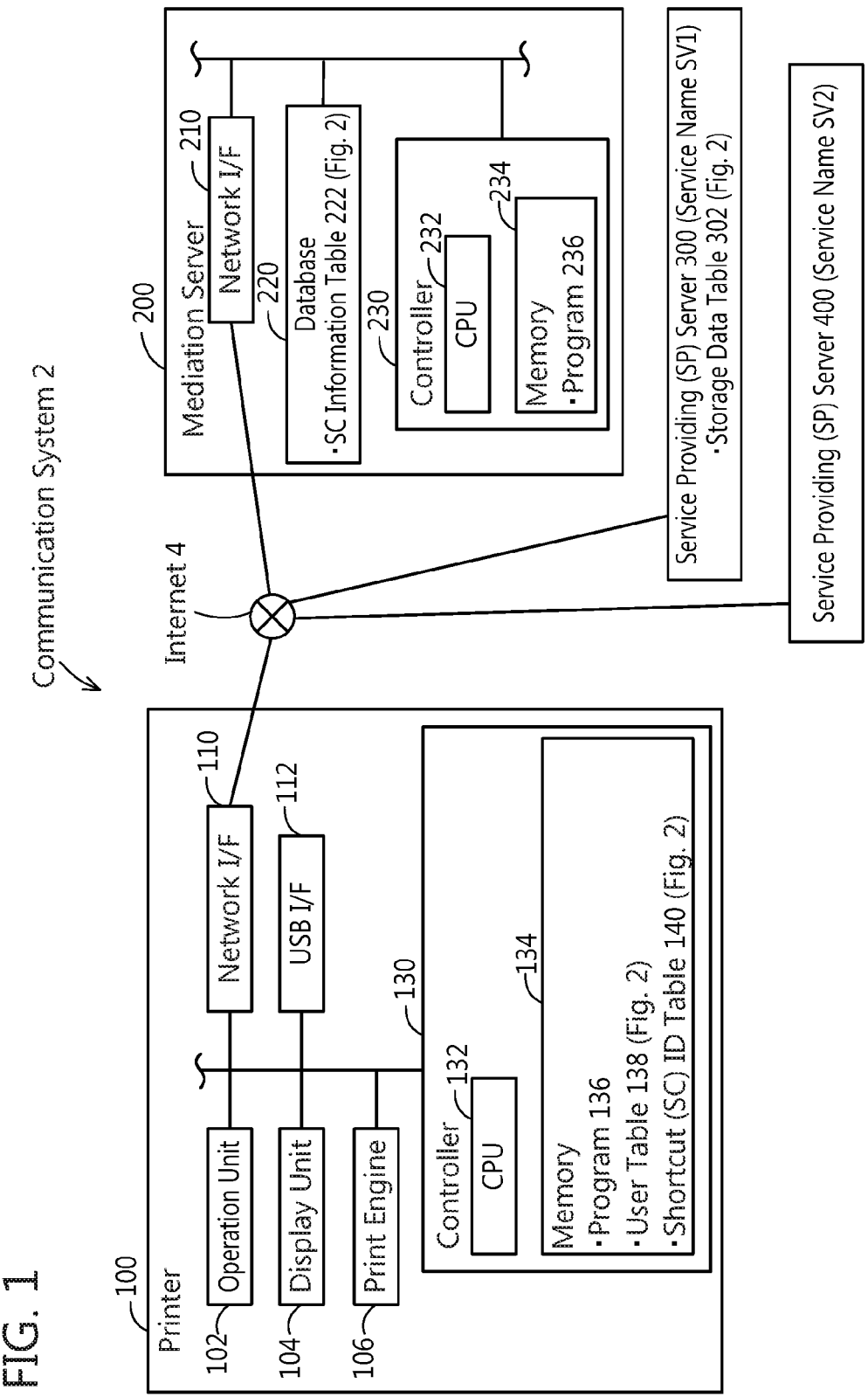
FIG. 1 illustrates a configuration of a communication system.

As shown in FIG. 1, a communication system 2 comprises a printer 100 and a mediation server 200. The printer 100 and the mediation server 200 are capable of mutual communication via the Internet 4. The printer 100 and the mediation server 200 are further capable of communication, via the Internet 4, with each of a plurality of service providing servers (called "SP (abbreviation of Service Provider) servers" below) 300, 400.

(Configuration of Printer 100)

The printer 100 is a peripheral device (e.g., a peripheral device of a PC or the like, not shown) capable of performing a print function. Moreover, the printer 100 may need to be capable of performing at least a print function, and may be a multi-function device further capable of performing a scan function, copy function, facsimile function, etc.

The printer 100 comprises an operation unit 102, a display unit 104, a print engine 106, a network interface 110, a USB interface 112, and a controller 130. Below, interface is referred to as "I/F". The operation unit 102 comprises a plurality of keys. A user can input various instructions to the printer 100 by operating the operation unit 102. The display unit 104 is a display for displaying various information. The display unit 104 functions as a so-called touch panel. That is, the display unit also functions as an operation unit. Below, the reference numbers 102, 104 at locations of the operation units of the printer 100 are omitted, and these are referred to simply as "operation units". The print engine 106 comprises an ink jet method, laser method, etc. printing mechanism. The network I/F 110 is connected to the Internet 4 via a LAN (abbreviation of Local Area Network), not shown. The USB I/F 112 comprises a slot to which a USB memory is attached.

The controller 130 comprises a CPU 132 and a memory 134. The CPU 132 performs various processes in accordance with a program 136 stored in the memory 134. In addition to the program 136, the memory 134 stores a user table 138 and a shortcut ID table 140. Below, shortcut is referred to as "SC (abbreviation of Shortcut)".

(Configuration of Mediation Server 200)

The mediation server 200 is installed on the Internet 4 by a vendor of the printer 100, and is a server for mediating execution of the print function by the printer 100. More specifically, the mediation server 200 performs various processes for causing the printer 100 to print an image represented by an image file stored in the SP servers 300, 400.

The mediation server 200 comprises a network IF 210, a database 220, and a controller 230. The network/F 210 is connected to the Internet 4. The database 220 stores an SC information table 222.

The controller 230 comprises a CPU 232 and a memory 234. The CPU 232 performs various processes in accordance with a program 236 stored in the memory 234. The program 236 includes a program for using a plurality of APIs (Application Program Interfaces) corresponding to the plurality of SP servers 300, 400. Consequently, the CPU 232 is capable of performing communication corresponding to each of the APIs with each of the SP servers 300, 400. Thus, since the mediation server 200 is capable of performing the communication corresponding to each of the APIs, the printer 100 does not need to comprise a program for using each API.

(Configurations of Service Providing Server (SP Servers) 300, 400)

Each of the SP servers 300, 400 is a known third party server such as, e.g., "Evernote (registered trademark)", "Google (registered trademark) Docs", "PICASA (registered trademark)", "FACEBOOK (registered trademark)", etc. Each of the SP servers 300, 400 is capable of providing a service to various communication apparatuses including the printer 100. In the present embodiment, a service name of the SP server 300, and a service name of the SP server 400 are expressed by reference numbers SV1, SV2, respectively.

The SP server 300 comprises a storage data table 302, and is capable of providing a service of storing an image file obtained from a communication apparatus in the table 302. Further, the SP server 300 is capable of providing a service to supply an image file in the table 302 to the communication apparatus. From the perspective of the communication apparatus, the former service and the latter service are, respectively, a service to upload an image file to the SP server 300, and a service to download an image file from the SP server 300. For example, the printer 100 is capable of downloading an image file from the SP server 300, and performing a print of an image represented by that image file (called "DL (abbreviation of Download) print" below). The SP server 400 is also capable of providing the similar service to the SP server 300.

(Contents of Tables 138, 140, 222, 302; FIG. 2)

As shown in FIG. 2, a service name, display name, and access token (referred to as "AT (abbreviation of Access Token)" below) are registered in association with each other in the user table 138 in the printer 100. These pieces of information are information for receiving a service from a SP server (e.g., 300) by the user using the printer 100. The service name is a service name of the SP server. The display name is a name of the user displayed in the printer 100. The AT is authentication information for using the SP server. Below, a method will be described for a user corresponding to the display name "Ken" to register, in the user table 138, information (i.e., "SV1", "Ken", "AT1") for receiving a service from the SP server 300.

The user first registers account information including account name and password in the SP server 300 by using a communication apparatus such as a PC, smartphone, etc. Then, the user accesses the mediation server 200 by using the communication apparatus, and obtains a URL (Uniform Resource Locator) for accessing the SP server 300 from the mediation server 200. Then, the user accesses the SP server 300 from the communication apparatus by using the URL, and inputs the account information to the SP server 300 so as to perform an authentication procedure. When the authentication succeeds, the SP server 300 generates AT1, which is the AT corresponding to this account information, and supplies the AT1 to the mediation server 200. Upon obtaining the AT1 from the SP server 300, the mediation server 200 generates a temporary ID corresponding to the AT1, and supplies the temporary ID to the communication apparatus. As a result, the temporary ID is displayed in the communication apparatus.

Next, the user operates the operation unit of the printer 100, inputting the service name "SV1", the display name "Ken", and the temporary ID to the printer 100. In this case, the printer 100 supplies the inputted temporary ID to the mediation server 200, and obtains the AT1 corresponding to the temporary ID from the mediation server 200. Then, the printer 100 registers the inputted service name "SV1", the inputted display name "Ken", and the obtained AT1 in association with each other in the user table 138. Other information in the table 138 is also registered in the same manner.

An SCID, an SC name, a service name, a display name, and a function name are registered in association with each other in the SCID table 140 in the printer 100. These pieces of information are information for causing the printer 100 to perform a DL print using the SC information in the mediation server 200. The SCID is an identifier for identifying the SC information. The SC name is a name for display of the SC information. The function name is a name indicating either a function of DL print or DL media. The DL media is a function for storing an image file, downloaded from the SP server 300 or the like, in a USB memory attached to the USB I/F 112.

The SC information is registered in the SC information table 222 in the mediation server 200. The SC information includes at least an SCID and a folder ID. The folder ID is an identifier for identifying a folder in the SP server 300, etc. The SC information may further include a file ID and a print setting. The file ID is an identifier for identifying an image file. The print setting is information for causing the printer 100 to perform a print. Specifically, print conditions which are available to the printer 100 include a plurality of qualities, a plurality of paper types, and a plurality of number of colors. The plurality of qualities includes, e.g., a high quality "Fine" that corresponds to a comparatively high print resolution, and "Normal" that corresponds to a comparatively low print resolution. The plurality of paper types includes, e.g., inkjet paper "Inkjet" and normal paper "Plain". The plurality of number of colors includes color print "Color" and monochrome print "Mono". The print setting is information selected by the user from among the print conditions available to the printer 100. Moreover, a manner in which the information is registered in the tables 140, 222 will be described later.

The account information, the AT, and upload data are registered in association with each other in the storage data table 302 in the service providing server 300. As described above, the account information is information registered by the user, and the AT is information supplied to the mediation server 200 when the authentication of the account information has succeeded. The upload data includes folder information and image file information, and further includes information indicating a hierarchical relationship of the folders and files. Moreover, although not shown, in a case where a hierarchical relationship of upper and lower folders exists, the upload data also includes information indicating a plurality of pieces of folder information and hierarchical relationship information thereof.

The folder information includes a folder name and folder ID. The folder name is designated by the user when a folder is newly generated in the SP server 300. The folder ID is generated by the SP server 300 when a folder is newly generated. The image file information includes an image file, a file name, the file ID, and a thumbnail file. The image file is a file uploaded from the communication apparatus, and the file name is a name of that image file. The file ID is an identifier for identifying that image file, and is generated by the SP server 300 when the image file is uploaded. The thumbnail file is a file representing the same image as the image represented by the image file, and has a smaller number of pixels than the number of pixels configuring the image file. The thumbnail file is generated by the SP server 300 when the image file is uploaded.

(Normal DL Print; FIG. 3)

Next, a process for causing the printer 100 to perform a DL print (called "normal DL print" below) which does not use the SC information will be described with reference to FIG. 3. The CPU 132 is causing the display unit 104 to display a standby screen SR0 of FIG. 8, and waits until receiving an operation of the user. The screen SR0 includes a web button for accessing the mediation server 200 and a custom button for performing an operation relating to the SC.

In S10 of FIG. 3, an operation of the Web button in the screen SR0 is performed on the operation unit. In this case, in S12, the CPU 132 supplies a Web start request to the mediation server 200 via the network I/F 110. The request is a command for requesting a start of processing relating to the DL print. Moreover, in the present embodiment, communication of the printer 100 is always performed via the network I/F 110. Therefore, below, the description "via the network I/F 110" will be omitted. Similarly, the description "via the network I/F 210" will also be omitted for communication of the mediation server 200.

In response to obtaining the request of S12, in S20 the CPU 232 supplies a service list to the printer 100. The list includes text data indicating the plurality of service names "SV1", "SV2", etc. of the plurality of SP servers 300, 400, etc.

Figure 8:
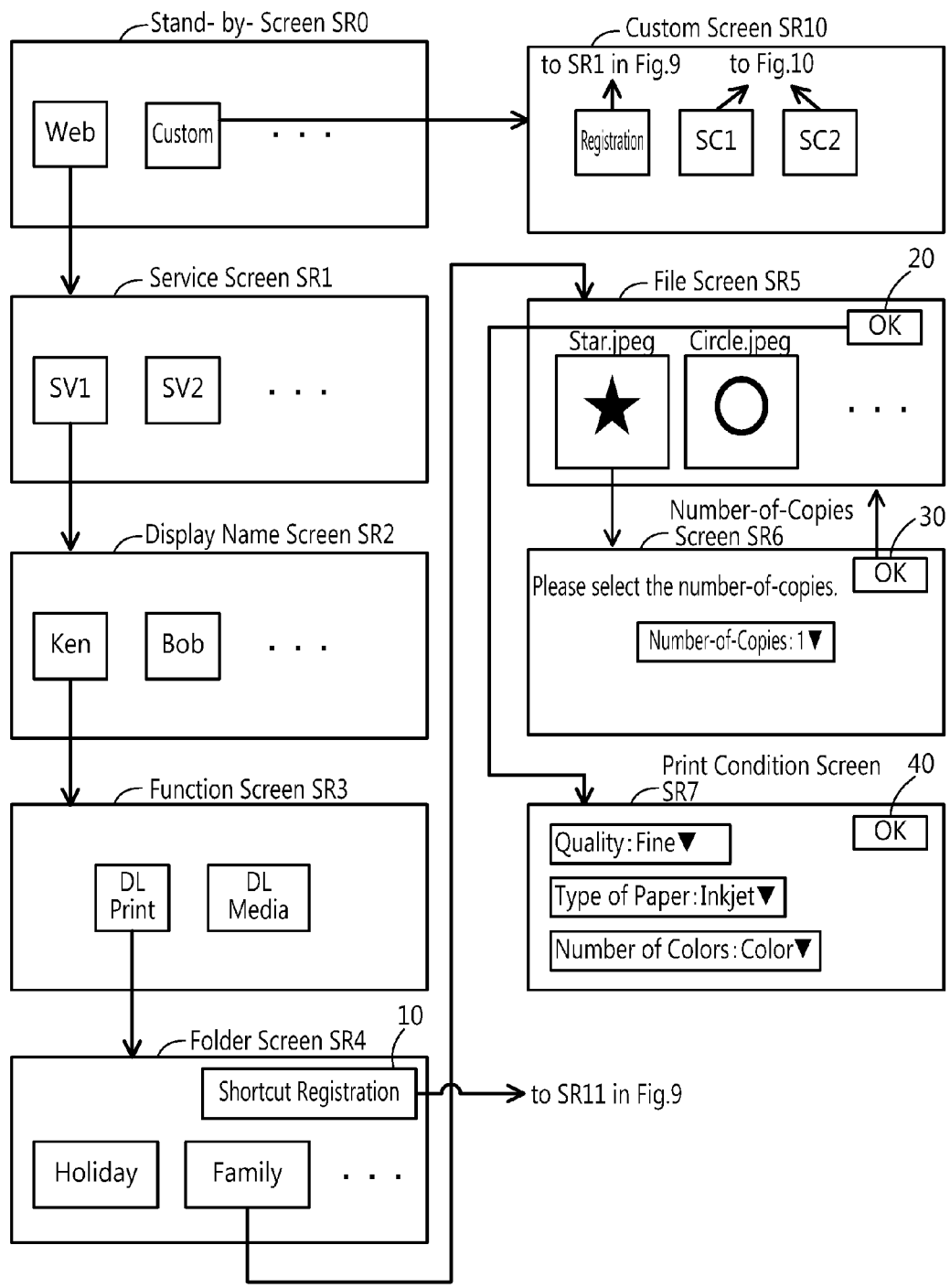
FIG. 8 illustrates an example of each screen that is displayed for performing the normal download print.

In response to obtaining the list of S20, by using the list, in S22 the CPU 132 causes the display unit 104 to display a service screen SR1 of FIG. 8. Specifically, the memory 134 is storing in advance template data (e.g., data indicating a frame of a button on which the service name is written) for the display of the screen SR1. By using the template data and the list, the CPU 132 generates screen data representing the screen SR1, supplies the screen data to the display unit 104, and causes the display unit 104 to display the screen SR1. Notably, the aspect of using this type of template data is also the same in a case where screens to be described later (e.g., SR2, SR3, etc.) are displayed, and a description thereof will be omitted below. The screen SR1 is a screen for causing the user to select one service name from among the plurality of service names "SV1", etc., that is, is a screen for causing the user to select one SP server from among the plurality of SP servers 300, etc. In S24, an operation for selecting one service name in the screen SR1 (in the present case, "SV1" corresponding to the SP server 300) is performed on the operation unit. In this case, in S26, the CPU 132 supplies the selected service name "SV1" to the mediation server 200.

In response to obtaining the service name "SV1" of S26, in S30 the CPU 232 supplies to the printer 100 a user table request for requesting the supply of the user table 138.

In response to obtaining the request of S30, in S32 the CPU 132 supplies the user table 138 in the memory 134 to the mediation server 200.

In response to obtaining the table 138 of S32, in S40 the CPU 232 supplies to the printer 100 a display name list including one or more display names in the table 138.

In response to obtaining the list of S40, in S42, by using the list, the CPU 132 causes the display unit 104 to display a display name screen SR2 of FIG. 8. The screen SR2 is a screen for causing the user to select one display name from among the one or more display names. In S44, an operation for selecting one display name in the screen SR2 is performed on the operation unit. In this case, in S46, the CPU 132 supplies the selected display name to the mediation server 200.

In response to obtaining the display name of S46, in S50 the CPU 232 supplies to the printer 100 a function list including a plurality of function names including the DL print and DL media.

In response to obtaining the list of S50, in S52, by using the list, the CPU 132 causes the display unit 104 to display a function screen SR3 of FIG. 8. The screen SR3 is a screen for causing the user to select one function name from among the plurality of function names. In S54, an operation for selecting one function name (in the present case "DL print") in the function screen SR3 is performed on the operation unit. In this case, in S56 the CPU 132 supplies the selected function name "DL print" to the mediation server 200.

In response to obtaining the function name "DL print" of S56, the CPU 232 first determines that a communication with the SP server 300 corresponding to the service name "SV1" of S26 is to be performed and, further, obtains an AT associated with the service name "SV1" of S26 and the display name of S46 from the user table 138 of S32 (see FIG. 2). Below, this AT is called "target AT". Then, in S60, the CPU 232 supplies a data request including the target AT to the determined SP server 300. The request is a command for requesting the supply of the folder information corresponding to the target AT. As a result, in S62, the CPU 232 obtains, from the SP server 300, one or more pieces of the folder information (i.e., the folder name and the folder ID; see the table 302 of FIG. 2) which are located at an uppermost hierarchy among all the folder information associated with the target AT.

In response to obtaining the one or more pieces of the folder information of S62, in S70 the CPU 232 supplies to the printer 100 a folder list including this one or more pieces of folder information and SC tab data for displaying an SC tab.

In response to obtaining the list and data of S70, by using the list and the data, in S72 the CPU 132 causes the display unit 104 to display a folder screen SR4 of FIG. 8. The screen SR4 is a screen for causing the user to select one folder name (e.g., "Holiday", etc.) from among the one or more folder names. In S74, an operation for selecting one folder name in the screen SR4 is performed on the operation unit. In this case, in S76 the CPU 132 obtains the folder ID corresponding to the selected folder name from the folder list of S70, and supplies the obtained folder ID to the mediation server 200.

In response to obtaining the folder ID of S76, the CPU 232 supplies a data request including this folder ID and the target AT to the SP server 300. As a result, the CPU 232 can obtain, from the SP server 300, one or more pieces of folder information located at a lower level of the folder information including this folder ID. Here, a case of not obtaining the folder information means that the folder information including this folder ID is the folder information of a lowermost level. In this case, the process of FIG. 3 ends, and the process proceeds to FIG. 4. On the other hand, in a case where one or more pieces of folder information are obtained here, S70 to S76 are performed again based on this one or more pieces of folder information. That is, S60 to S76 are performed repeatedly until a folder ID included in the lowermost level folder information is supplied to the mediation server 200 from the printer 100, and then the process proceeds to FIG. 4. Notably, below, a final folder ID supplied to the mediation server 200 from the printer 100 (i.e. the folder ID included in the lowermost level folder information) is called "target folder ID".

The folder screen SR4 of FIG. 8 further includes an SC tab 10 showing a character string related to registration of the SC information. In S74A, an operation for selecting the SC tab 10 in the screen SR4 is performed on the operation unit without performing selection of a folder name. In this case, in S249, the CPU 132 supplies a registration request to the mediation server 200 for requesting registration of the SC information. In this case, the processes from S250 of FIG. 5 onward are performed without performing the processes of FIG. 4.

(Normal DL Print; FIG. 4 (Continuation of FIG. 3))

Next, processes subsequent to S76 of FIG. 3 will be described with reference to FIG. 4. In S80, the CPU 232 supplies a data request including the target AT and the target folder ID to the SP server 300. The request is a command for requesting the supply of information relating to an image file (called "target file" below) being stored in a folder (called "target folder" below) identified by the target folder ID. As a result, in S82, the CPU 232 obtains one or more pieces of partial file information related to one or more target files from the SP server 300. The partial file information includes a file name, a file ID, and a thumbnail URL (abbreviation of Uniform Resource Locator). The file name and the file ID are information included in target file information (see table 302 of FIG. 2). Further, the thumbnail URL is information indicating a position of the thumbnail file included in the target file information.

In response to obtaining the one or more pieces of the partial file information of S82, in S90 the CPU 232 supplies to the printer 100 a file list including the one or more pieces of the partial file information, and number of copies display data. The file list includes a plurality selectable command indicating that it is possible to select a plurality of image files. The number of copies display data is data for displaying a number of copies screen.

In response to obtaining the list and data of S90, in S92 the CPU 132 supplies a thumbnail request including the target AT and the one or more thumbnail URLs in the list to the SP server 300 not via the mediation server 200. The request is a command for requesting the supply of a thumbnail file. As a result, in S94 the CPU 132 obtains one or more thumbnail files specified by the one or more thumbnail URLs from the SP server 300, not via the mediation server 200. Notably, if adopting a configuration in which the thumbnail file is supplied to the printer 100 via the mediation server 200, the mediation server 200 might obtain a personal image of the user from the SP server 300, and consequently the user might feel uncomfortable. In the present embodiment, the thumbnail file is supplied to the printer 100 not via the mediation server 200, and consequently discomfort of the user can be prevented. However, in a modification, in S82 the mediation server 200 may obtain the thumbnail file from the SP server 300 and, in S90, supply a file list including that file to the printer 100. In this case, S92 and S94 can be omitted.

In response to obtaining the one or more thumbnail files of S94, in S96 the CPU 132 causes the display unit 104 to display a file screen SR5 of FIG. 8 by using the one or more thumbnail files and the list of S90. The screen SR5 includes, for each of the one or more thumbnail files, a thumbnail image (e.g., an image indicating a star, etc.) represented by the thumbnail file, a file name (e.g., "star.jpeg") of an original image file of this thumbnail file, and an OK button 20. In particular, the screen SR5 has a state allowing selection of a plurality of thumbnail images in response to the plurality selectable command obtained in S90. That is, the screen SR5 is a screen for causing the user to select one or more thumbnail images (in other words, one or more target files).

In S98, an operation for selecting one thumbnail image in the screen SR5 is performed on the operation unit. In this case, in S100, by using the number of copies display data of S90, the CPU 132 causes the display unit 104 to display a number of copies screen SR6 of FIG. 8. The screen SR6 includes a box for selecting a number of copies, and an OK button 30. In S102, an operation for selecting the number of copies, and an operation for selecting the OK button 30 in the screen SR6 is performed on the operation unit. When S102 is performed, the screen SR5 is displayed again. Then, when an operation for selecting another one thumbnail image is performed, the screen SR6 is displayed again. That is, in a case where a plurality of target files is selected, S96 to S102 are performed repeatedly. In a case where the OK button 20 in the screen SR5 is selected, the process proceeds to S104.

In S104, the CPU 132 first obtains the file ID corresponding to the target file from the file list of S90 for each of the selected one or more target files, and combines the obtained file ID and the number of copies selected for the target file and generates combined data. Next, the CPU 132 supplies one or more pieces of the combined data to the mediation server 200.

In response to obtaining the one or more pieces of the combined data of S104, in S110 the CPU 232 supplies, to the printer 100, a print condition list indicating print conditions which are available to the printer 100. Notably, at a stage of S12 of FIG. 3 for example, the CPU 232 obtains a model name of the printer 100 from the printer 100. Then, based on the model name, the CPU 232 specifies print conditions available to the printer 100, and supplies a print condition list indicating the print conditions to the printer 100.

In response to obtaining the list of S110, in S112, by using the list, the CPU 132 causes the display unit 104 to display a print condition screen SR7 of FIG. 8. The screen SR7 includes three boxes for selecting a print setting from among the print conditions, and an OK button 40. In S114, an operation for selecting a print setting and an operation for selecting the OK button 40 in the screen SR7 are performed on the operation unit. In this case, in S116, the CPU 132 supplies the selected print setting to the mediation server 200.

In response to obtaining the print setting of S116, in S120 the CPU 232 first obtains one or more file IDs from the one or more pieces of the combined data of S104, and supplies to the SP server 300 a data request including the target AT and the one or more file IDs. The request is a command for requesting the supply of a URL (called "file URL" below) of a target file identified by the file ID. As a result, in S122, the CPU 232 obtains one or more file URLs from the SP server 300.

In response to obtaining the one or more file URLs of S122, in S130 the CPU 232 first specifies, for each of the one or more file URLs, the file ID corresponding to that file URL, and the number of copies obtained in S104. Then, for each of the one or more file URLs, the CPU 232 supplies, to the printer 100, a print instruction including the file URL, the specified number of copies, and the print setting of S116. Consequently, the CPU 232 supplies one or more print instructions including the one or more file URLs to the printer 100. The instruction is a command for causing the printer 100 to print an image represented by the target file specified by the file URL. More specifically, the instruction is a command for causing the printer 100 to print an image in accordance with the print setting in the instruction onto a number of sheets of print media corresponding to the number of copies in the instruction.

In response to obtaining the one or more print instructions of S130, in S132 the CPU 132 supplies an image file request including the target AT and one file URL included in one instruction in the one or more print instructions, to the SP server 300 not via the mediation server 200. The request is a command for requesting the supply of an image file (i.e. target file) specified by the file URL. As a result, in S134, the CPU 132 obtains the image file from the SP server 300 not via the mediation server 200. In the present embodiment, since the image file is supplied to the printer 100 not via the mediation server 200, discomfort of the user is prevented. However, in a modification, in S122 the mediation server 200 may obtain the image file from the SP server 300 and, in S130, supply a print instruction including that image file to the printer 100. In this case, S132 and S134 can be omitted.

In response to obtaining the image file of S134, in S136 the CPU 132 first converts that image file (e.g., RGB multiple-value data), generating print data having a data format (e.g., CMYK binary data) that can be interpreted by the print engine 106. Next, the CPU 132 supplies the print data to the print engine 106, and causes the print engine 106 to print an image represented by the print data (i.e., image represented by the image file). Notably, in a case where a plurality of print instructions (see S130) is obtained from the mediation server 200, the CPU 132 again performs S132 to S136 in response to other print instructions. That is, in a case where a plurality of print instructions is supplied to the printer 100 from the mediation server 200, S132 to S136 are performed repeatedly. When printing in accordance with all the print instructions is completed, processing related to the normal DL print ends.

As described above, the mediation server 200 can supply the file list including the plurality selectable command to the printer 100 (S90), and cause the printer 100 to display the file screen SR5 in a state allowing a plurality of target files to be selected (S96). Then, in the case of obtaining a plurality of pieces of combined data corresponding to the plurality of target files selected in the screen SR5 (S104), the mediation server 200 supplies, to the printer 100, a plurality of print instructions in accordance with the plurality of pieces of combined data (S130). As a result, the mediation server 200 can appropriately cause the printer 100 to print a plurality of images represented by the plurality of target files. Further, the mediation server 200 supplies the number of copies display data to the printer 100 (S90), and causes the printer 100 to display the number of copies screen SR6 (S102). Then, the mediation server 200 obtains the number of copies selected in the screen SR6 (S104), and supplies a print instruction including the number of copies to the printer 100 (S130). As a result, the mediation server 200 can appropriately cause the printer 100 to print onto the print media having a number of sheets corresponding to the number of copies.

(Registration of SC Information; FIG. 5)

Next, a process for registering the SC information in the mediation server 200 will be described with reference to FIG. 5. In S210, an operation of the custom button in the standby screen SR0 of FIG. 8 is performed on the operation unit. In this case, in S212, by using the SCID table 140 (see FIG. 2) in the memory 134, the CPU 132 causes the display unit 104 to display a custom screen SR10. Specifically, in a case where one or more SC names are registered in the table 140, the CPU 132 causes the display unit 104 to display the screen SR10 including a registration button indicating registration, and one or more SC buttons indicating the one or more SC names. On the other hand, in a case where not even one SC name is registered in the table 140, the CPU 132 causes the display unit 104 to display the screen SR10 including the registration button, and not including an SC button.

In S214, operation of the registration button in the screen SR10 is performed on the operation unit. In this case, in S216, the CPU 132 supplies a registration request for requesting registration of the SC information to the mediation server 200. Then, in S220, the same processes as S20 to S56 of FIG. 3 are performed. As a result, the screens SR1 to SR3 of FIG. 9 are sequentially displayed in the printer 100 (S22, S42, S52), and the service name "SV1", the display name, and the function name "DL print" are provided sequentially from the printer 100 to the mediation server 200 (S26, S46, S56).

In response to obtaining the function name "DL print", in S250 the CPU 232 supplies SC type data indicating a plurality of types of SC to the printer 100. Notably, the CPU 232 also performs the process of S250 (and further, the processes subsequent thereto) even in response to obtaining the registration request of S249 of FIG. 3.

Figure 9:
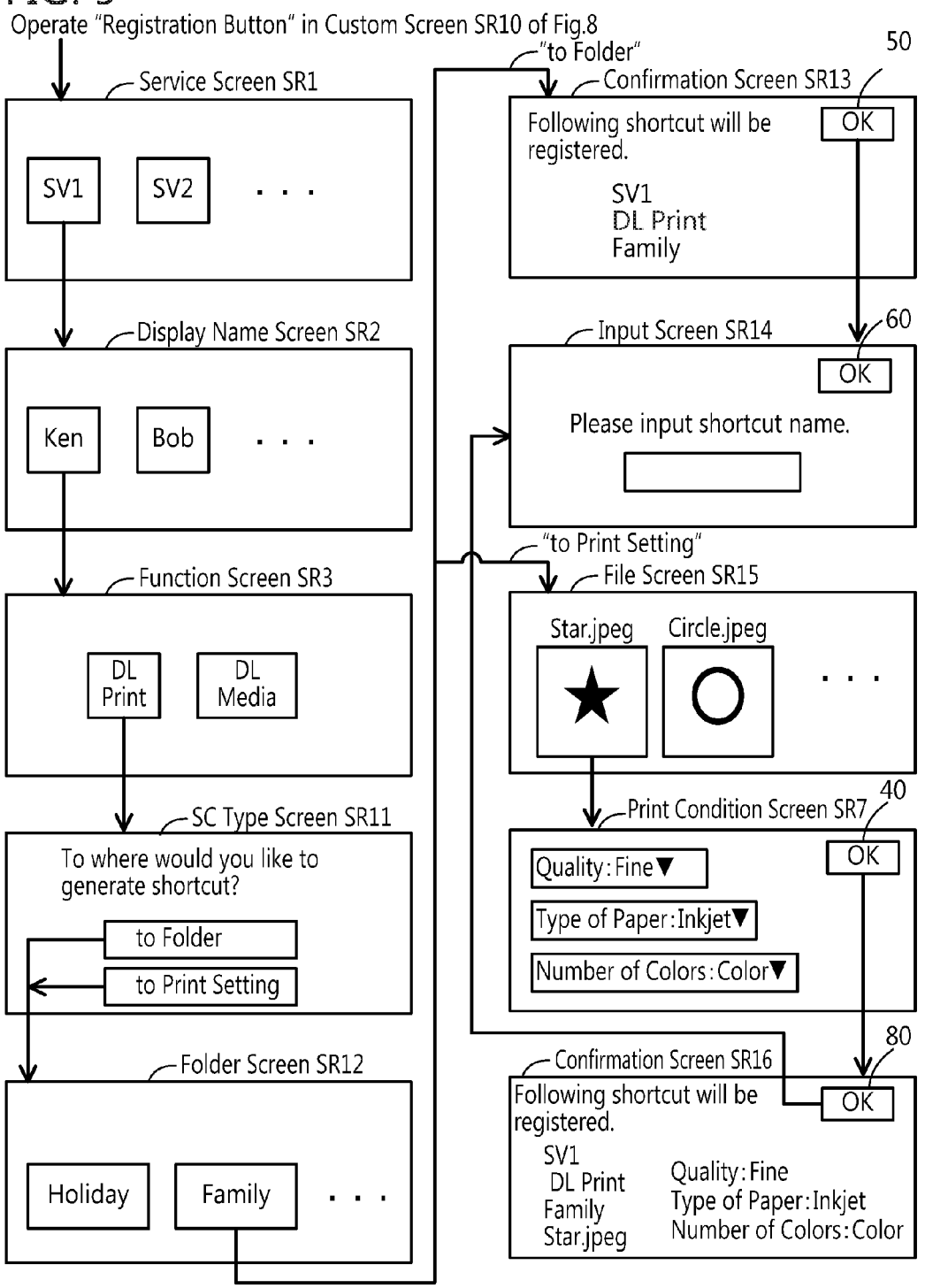
FIG. 9 illustrates an example of each screen that is displayed for registering the shortcut information.

In response to obtaining the data of S250, by using the data, in S252 the CPU 132 causes the display unit 104 to display an SC type screen SR11 of FIG. 9. The SC type screen SR11 is a screen for causing the user to select one type of SC from among the plurality of types of SC. The plurality of types of SC includes an SC type "to folder", and an SC type "to print setting". In S254, an operation for selecting one type of SC in the screen SR11 is performed on the operation unit. In this case, in S256, the CPU 132 supplies the selected SC type to the mediation server 200.

In response to obtaining the SC type of S256, the CPU 232 performs S260, S262, which are the same as S60, S62 of FIG. 3, and obtains one or more pieces of folder information from the SP server 300. In this case, in S270, the CPU 232 supplies a folder list including the one or more pieces of folder information to the printer 100. In S270, unlike S70 of FIG. 3, SC tab data is not supplied.

In response to obtaining the list of S270, in S272, by using the list, the CPU 132 causes the display unit 104 to display a folder screen SR12 of FIG. 9. The screen SR12 is substantially the same as the screen SR4 of FIG. 8 but, because the SC tab data is not obtained from the mediation server 200 (S270), the screen SR12 does not include the SC tab 10. Then, S274 and S276 are performed in the same manner as S74 and S76 of FIG. 3. Further, S260 to S276 are performed repeatedly until the target folder ID included in the lowermost level folder information is supplied to the mediation server 200 from the printer 100.

In response to obtaining the target folder ID of S276, in S278 the CPU 232 determines whether the SC type of S256 indicates "to folder" or indicates "to print setting". In a case of determining that the SC type indicates "to folder" (YES in S278), the CPU 232 proceeds to S280, and in a case of determining that the SC type indicates "to print setting" (NO in S278), the CPU 232 proceeds to S380 of FIG. 6.

In S280, the CPU 232 first obtains the folder name corresponding to the target folder ID of S276 from the one or more pieces of folder information of S262. Then, the CPU 232 supplies, to the printer 100, a confirmation request including the respective information obtained in S220 (i.e., the service name "SV1" (see S26 of FIG. 3), the function name "DL print"), and the obtained folder name.

In response to obtaining the request of S280, in S282 the CPU 132 causes the display unit 104 to display a confirmation screen SR13 of FIG. 9 by using the respective information in the request. The screen SR13 includes the respective information and an OK button 50, and is a screen for the user to confirm whether the SC information corresponding to the respective information is to be registered. In S284, an operation for selecting the OK button 50 is performed on the operation unit. In this case, in S286 the CPU 132 supplies OK information to the mediation server 200. Notably, although not shown, the screen SR13 includes a cancel button, and in a case where the cancel button is selected, the CPU 132 supplies cancel information to the mediation server 200. In this case, the subsequent S290 to S304 are not performed. Moreover, in a modification, in the case of YES in S278, S290 may be performed without performing S280 to S286.

In response to obtaining the OK information of S286, in S290 the CPU 232 supplies, to the printer 100, an SC name request for requesting the supply of the SC name.

In response to obtaining the SC name request of S290, in S292 the CPU 132 causes the display unit 104 to display an input screen SR14 of FIG. 9. The screen SR14 includes a box for inputting the SC name, and an OK button 60. In S294, an operation for inputting the SC name and an operation for selecting the OK button 60 are performed on the operation unit. In this case, in S296, the CPU 132 supplies the inputted SC name to the mediation server 200.

In response to obtaining the SC name of S296, in S300 the CPU 232 generates an SCID, which is a unique ID, and registers SC information including this SCID and the target folder ID of S276 in the SC information table 222 (see FIG. 2). As a result, for example, as shown in an SCID "ID2" in the table 222, SC information is registered which includes a folder ID "FDID2", but does not include a file ID and a print setting. Then, in S302, the CPU 232 supplies to the printer 100 a registration instruction for instructing registration of the SCID, etc. The instruction includes the SCID of S300, the SC name of S296, the respective information obtained in S220 (i.e., the service name "SV1" (see S26 of FIG. 3), the display name (see S46), and the function name (see S56)).

In response to obtaining the instruction of S302, in S304 the CPU 132 registers the respective information in the instruction in association with each other in the SCID table 140 (see FIG. 2). As a result, for example as shown in the SCID "ID2" in the table 140, the respective information including the SC name "SC2", the service name "SV1", the display name "Ken", and the function name "DL print", is registered. Thereby, the registration of the SC information corresponding to the SC type "to folder" in the mediation server 200 (S300) is completed, and the registration of the SCID, etc. corresponding to this SC information in the printer 100 (S304) is completed.

(Shortcut Registration; FIG. 6 (Continuation of FIG. 5))

Next, a process for registering the SC information corresponding to the SC type "to print setting" will be described with reference to FIG. 6. As described above, in the case of determining that the SC type indicates "to print setting" in S278 of FIG. 5 (NO in S278), the process of FIG. 6 is performed.

The CPU 232 performs S380, S382 in the same manner as S80, S82 of FIG. 4, and obtains one or more pieces of partial file information from the SP server 300. In this case, in S390 the CPU 232 supplies a file list including the one or more pieces of partial file information to the printer 100. Unlike S90 of FIG. 4, the file list does not include the plurality selectable command and, further, the number of copies display data is not supplied.

In response to obtaining the list of S390, the CPU 132 performs S392, S394 in the same manner as S92, S94 of FIG. 4, and obtains one or more thumbnail files from the SP server 300. In this case, in S396, the CPU 132 causes the display unit 104 to display a file screen SR15 of FIG. 9 by using those one or more thumbnail files and the list of S390. The screen SR15 is substantially the same as the screen SR5 of FIG. 8 but, since the plurality selectable command is not included in the list of S390, the screen SR15 does not include the OK button 20. As described above, in the screen SR5, the user can select the OK button 20 after having selected a plurality of thumbnail images. By contrast, in the screen SR15, when the user selects one thumbnail image, selection of an additional thumbnail image is not permitted, and the screen is automatically transitioned to a next screen (i.e. SR7). Thus, since the screen SR15 has a state allowing selection of only one thumbnail image (i.e. one target file), the SC information corresponding to only one target file is registered. That is, since registration of one piece of SC information corresponding to a plurality of target files is not performed, it is possible to prevent data size of the one piece of SC information from becoming large, and consequently it is possible to prevent an increase of a load on the database 220. Notably, in a modification, the screen SR15 may have a state allowing the selection of a plurality of thumbnail images, as with the case of normal DL print. That is, one piece of SC information corresponding to a plurality of target files may be registered.

Further, since the number of copies display data is not obtained with the list of S390, the transition to the next screen (i.e. SR7) is performed without the number of copies screen SR6 (see FIG. 8) being displayed, even if a thumbnail image in the screen SR15 has been selected. Thus, since the screen SR6 is not displayed, the SC information including the number of copies is not registered. Due to this, the user can select a desired number of copies when performing the DL print using the SC information. Moreover, in a modification, the number of copies screen SR6 may be displayed in the case where a thumbnail image in the screen SR15 is selected, as with the case of normal DL print. That is, SC information including the number of copies may be registered. In this case, the user may not need to select the number of copies when performing the DL print using the SC information.

In S398, an operation for selecting one thumbnail image (i.e. one target file) in the screen SR15 is performed on the operation unit. In this case, in S400, the CPU 132 obtains the file ID corresponding to the selected target file from the file list of S390, and supplies the file ID to the mediation server 200. Then, S410 to S416 are performed in the same manner as S110 to S116 of FIG. 4.

In response to obtaining the print setting of S416, in S420 the CPU 232 first obtains the folder name corresponding to the target folder ID of S276 from the one or more pieces of folder information of S262 of FIG. 5, and obtains the file name corresponding to the file ID of S400 from the one or more pieces of partial file information of S382 of FIG. 6. Then, the CPU 232 supplies, to the printer 100, a confirmation request including the respective information obtained in S220 (i.e., the service name "SV1", the function name "DL print"), the obtained folder name, the obtained file name, and the print setting of S416.

In response to obtaining the request of S420, in S422 the CPU 132 causes the display unit 104 to display a confirmation screen SR16 of FIG. 9 by using the respective information in the request. The screen SR16 includes the respective information and an OK button 80, and is a screen for the user to confirm whether the SC information corresponding to the respective information is to be registered. In S424, an operation for selecting the OK button 80 is performed on the operation unit. In this case, S426 to S436 are performed in the same manner as S286 to S296 of FIG. 5. Notably, in a modification, after S416 has been performed, S430 may be performed without performing S420 to S426.

In response to obtaining the SC name of S436, in S440 the CPU 232 generates an SCID, which is a unique ID, and registers, in the SC information table 222 (see FIG. 2), SC information including this SCID, the target folder ID of S276 of FIG. 5, the file ID of S400 of FIG. 6, and the print setting of S416. As a result, for example as shown in the SCID "ID1" in the table 222, SC information is registered which includes a folder ID "FDID1", a file ID "FLID1", and print setting "Quality-Fine, etc.". Then, in S442, the CPU 232 supplies a registration instruction for instructing registration of the SCID, etc., to the printer 100.

In response to obtaining the instruction of S442, in S444 the CPU 132 registers the respective information in the instruction in association with each other in the SCID table 140 (see FIG. 2). As a result, for example, as shown in the SCID "ID1" in the table 140, the respective information including the SC name "SC1", the service name "SV1", the display name "Ken", and the function name "DL print" is registered. Due to this, the registration of the SC information corresponding to the SC type "to print setting" in the mediation server 200 (S440) is completed, and the registration of the SCID, etc. corresponding to this SC information in the printer 100 (S444) is completed.

As described above, in the case of obtaining the registration request of S216 of FIG. 5 or the registration request of S249 of FIG. 3, the mediation server 200 causes the printer 100 to display the SC type screen SR11. Due to this, the user can select a desired SC from among the plurality of types of SC. Then, the mediation server 200 registers SC information which includes the folder ID but does not include a file ID and a print setting (S300 of FIG. 5) in the case where the SC type "to folder" is selected by the user, and registers SC information which includes the folder ID, the file ID and the print setting (S440 of FIG. 6) in the case where the SC type "to print setting" is selected by the user. Thus, the mediation server 200 can appropriately register the SC information corresponding to the SC type selected by the user.

Further, as shown in FIG. 8, when the normal DL print is performed, the three screens SR4, SR5, SR7 for selecting three items relating to printing are sequentially displayed in a predetermined order (i.e., order: folder, file, print setting). For example, in a case of frequently using the normal DL print, the user is accustomed to selecting the items in the aforementioned predetermined order. Then, as shown in FIG. 9, when the registration of the SC information is performed, the three screens SR12, SR15, SR7 for selecting three items the same as the aforementioned three items are displayed in the same predetermined order. Due to this, the user can select each item in the same order as when performing the normal DL print, i.e., in the order of selection the user is accustomed to. Therefore, the user can easily select each item in order to register the SC information. Moreover, in a modification, the display order of the screens SR4, SR5, SR7 when performing the normal DL print may be different from the display order of the screens SR12, SR15, SR7 when performing the registration of the SC information.

Figure 7:
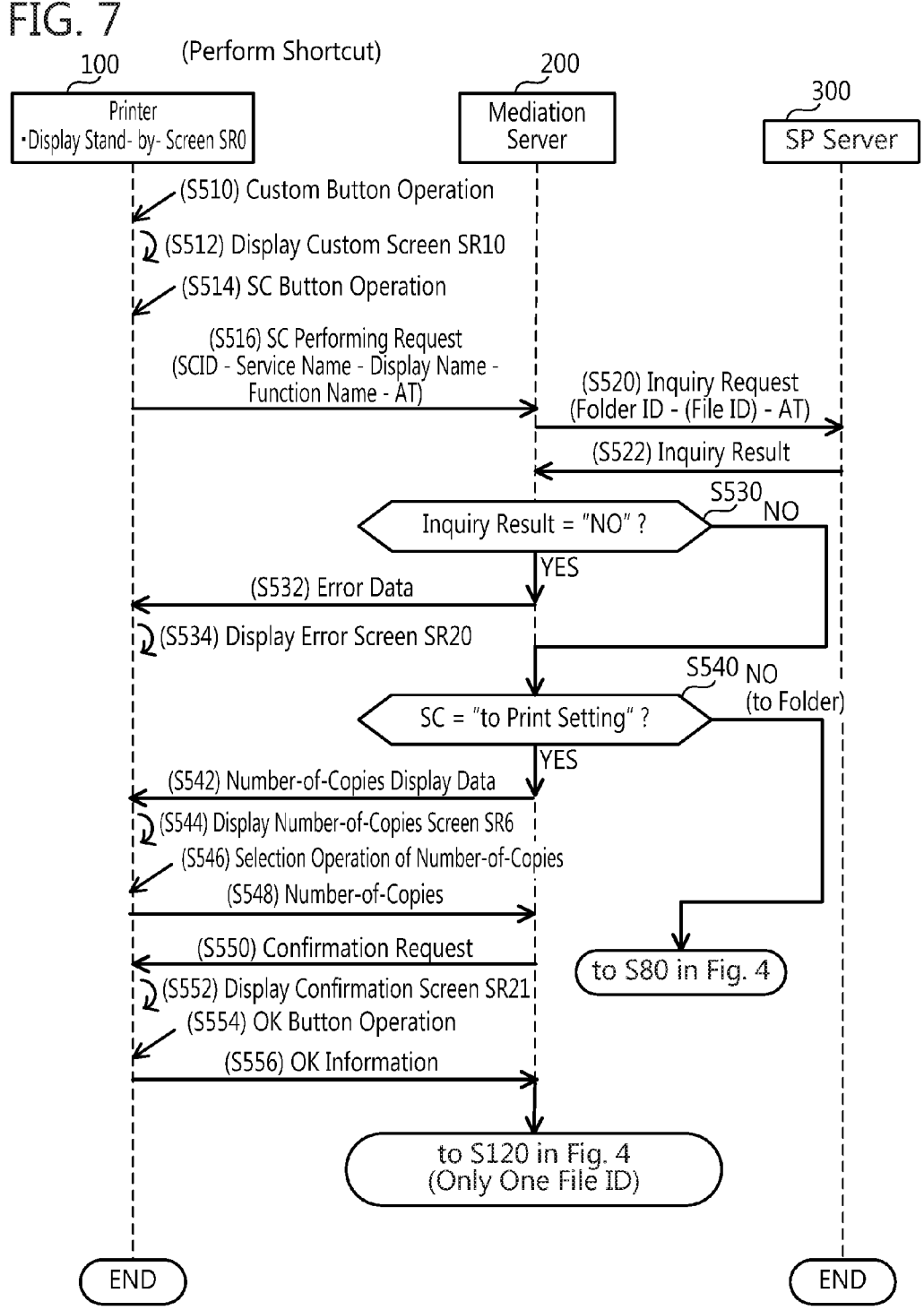
FIG. 7 illustrates a sequence chart of processes for performing a download print using the shortcut information.

(DL Print Using SC Information; FIG. 7)

Next, a process for causing the printer 100 to perform a DL print using SC information will be described with reference to FIG. 7. S510, S512 are the same as S210, S212 of FIG. 5. The custom screen SR10 of S512 includes an SC button indicating the SC name "SC1", and an SC button indicating the SC name "SC2". Notably, the SC name "SC1" corresponds to the SCID "ID1" (see table 140 of FIG. 2), and the SCID "ID1" corresponds to the SC type "to print setting" (see table 222 of FIG. 2). Similarly, the SC name "SC2" corresponds to the SC type "to folder" (see tables 140, 222 of FIG. 2).

In S514, an operation for selecting an SC button in the screen SR10 is performed on the operation unit. In this case, in S516, the CPU 132 first obtains the respective information (i.e., the SCID, the service name, the display name, the function name) corresponding to the SC name indicated by the selected SC button from the SCID table 140 (see FIG. 2), and obtains the AT corresponding to the obtained service name and the display name from the user table 138 (see FIG. 2). Then, the CPU 132 supplies an SC performing request including the obtained respective information to the mediation server 200. The request is a command for requesting use of the SC information corresponding to the SCID in the request.

In response to obtaining the request of S516, in S520 the CPU 232 first obtains the folder ID corresponding to the SCID in the request from the SC information table 222 (see FIG. 2) and, further, also obtains a file ID in a case where the file ID corresponding to the SCID in the request is present in the SC information table 222. The CPU 232, for example, obtains the file ID "FLID1" corresponding to the SCID "ID1" in a case where the request of S516 includes the SCID "ID1", and does not obtain a file ID in a case where the request of S516 includes the SCID "ID2". Then, the CPU 232 supplies, to the SP server 300, an inquiry request including the obtained folder ID (and the file ID) and the AT in the request of S516. The request is a command for inquiring whether the folder (and file) identified by the folder ID (and the file ID) is being stored in the SP server 300. As a result, in S522, the CPU 232 obtains an inquiry result from the SP server 300.

For example, it is possible that, after the SC information corresponding to the SC type "to folder" has been registered, a target folder of this SC information is deleted by the user from the SP server 300. In this case, the inquiry result includes information indicating no storage. Further, for example, is possible that, after the SC information corresponding to the SC type "to print setting" has been registered, a target file of this SC information is deleted by the user from the SP server 300. In this case, also, the inquiry result includes information indicating no storage. On the other hand, in a case where the target folder (and file) of this SC information is being stored, the inquiry result includes the folder name (and the file name) of the folder (and the file). Next, in S530, by using the inquiry result of S522, the CPU 232 determines whether the folder (and the file) are being stored in the SP server 300. In a case of determining that the inquiry result includes information indicating no storage (YES in S530), in S532 the CPU 232 supplies to the printer 100 error data indicating that a DL print is impossible.

Figure 10:
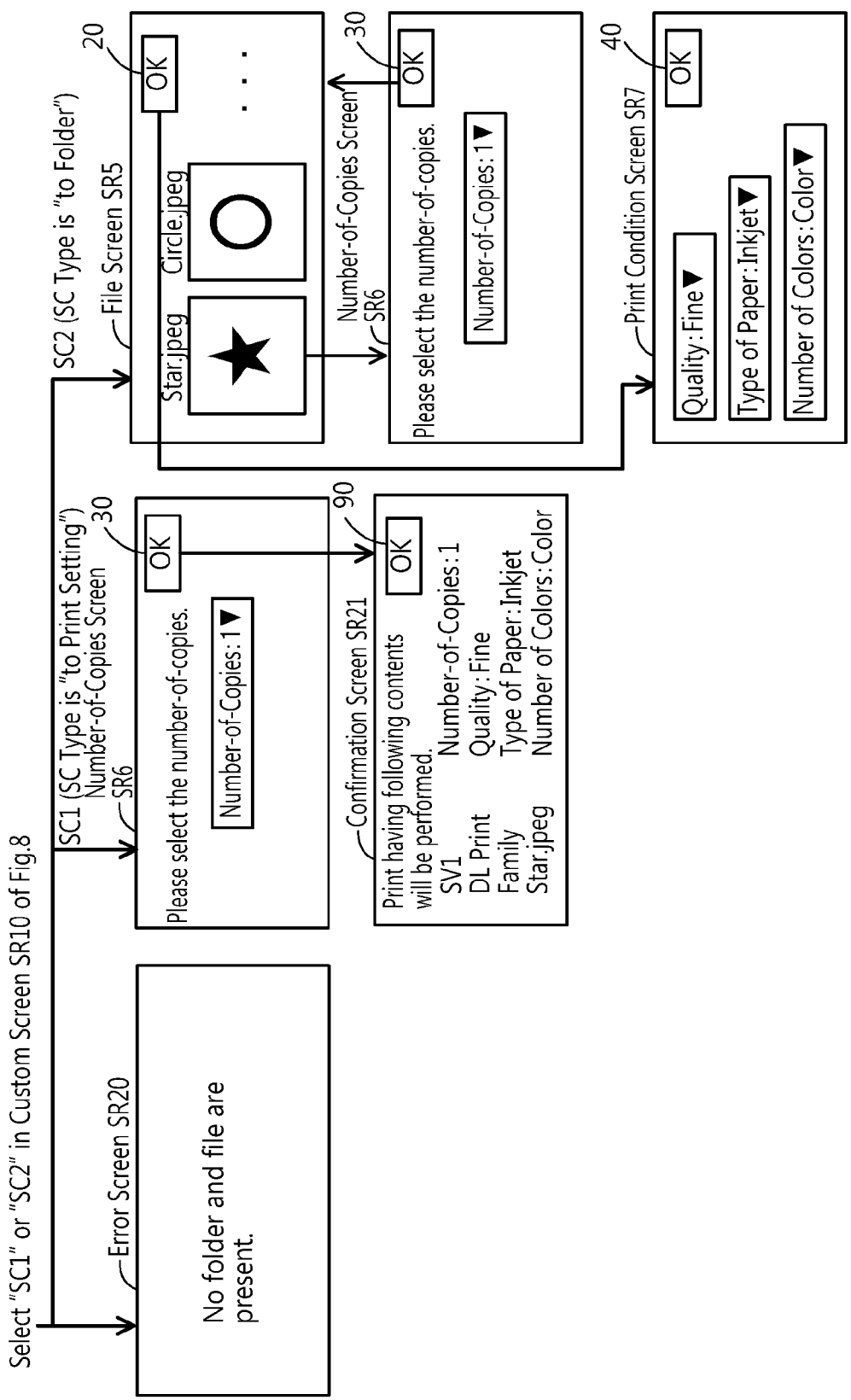
FIG. 10 illustrates an example of each screen that is displayed for performing the download print using the shortcut information.

In response to obtaining the error data of S532, in S534 the CPU 132 causes the display unit 104 to display an error screen SR20 of FIG. 10. The error screen SR20 includes a message indicating that a DL print using the SC information is impossible due to the folder or file not being present in the SP server 300. As a result, the user can know that a DL print using the SC information is impossible. When S534 ends, the process of FIG. 7 ends. Moreover, in a modification, after S516 has been performed, S540 may be performed without performing S520 to S534.

On the other hand, in a case of determining in S530 that the inquiry result includes the folder name (and the file name) (NO in S530), in S540 the CPU 232 determines whether the SC type of this target is "to print setting" or "to folder". Specifically, in a case where an inquiry request including the file ID is supplied in S520, the CPU 232 determines that the SC type is "to print setting" (YES in S540), and proceeds to S542. In S542, the CPU 232 supplies, to the printer 100, number of copies display data for displaying the number of copies screen.

In response to obtaining the data of S532, by using the data, in S544 the CPU 132 causes the display unit 104 to display the number of copies screen SR6 of FIG. 10 (i.e. the screen SR6 corresponding to "SC1"). In S546, an operation for selecting the number of copies in the screen SR6 and an operation for selecting the OK button 30 are performed on the operation unit. In this case, in S548, the CPU 132 supplies the selected number of copies to the mediation server 200.

In response to obtaining the number of copies of S548, in S550 the CPU 232 first obtains the print setting corresponding to the SCID in the request of S516 from the SC information table 222 (see FIG. 2). Then, the CPU 232 supplies, to the printer 100, a confirmation request including the respective information in the request of S516 (i.e., the service name, the function name), the respective information in the inquiry result of S522 (i.e., the folder name, the file name), the number of copies of S548, and the obtained print setting.

In response to obtaining the request of S550, in S552 the CPU 132 causes the display unit 104 to display a confirmation screen SR21 of FIG. 10 by using the respective information in the request. The screen SR21 includes the respective information and an OK button 90, and is a screen for the user to confirm whether a DL print in accordance with the respective information is to be performed. In S554, an operation for selecting the OK button 90 is performed on the operation unit. In this case, in S556 the CPU 132 supplies OK information to the mediation server 200. Moreover, in a modification, after S548 has been performed, the process may proceed to S120 of FIG. 4 without S550 to S556 being performed.

In response to obtaining the OK information of S556, the CPU 232 performs S120 to S130 of FIG. 4 by using the respective information in the request of S550. As a result, in the printer 100, S132 to S136 are performed, and a DL print using the SC information is performed.

On the other hand, in a case where an inquiry request not including a file TD is supplied in S520, the CPU 232 determines that the SC type is "to folder" (NO in S540), and proceeds to S80 of FIG. 4. As a result, S80 to S136 are performed. That is, the screens SR5, SR6, SR7 of FIG. 10 are sequentially displayed in the printer 100, and then a DL print using the SC information is performed.

As described above, in the case where the SC type is "to print setting", it is possible when performing a DL print using the SC information that the user has forgotten the file and the print setting which the user registered in the past. Consequently, when performing a DL print, the confirmation screen SR21 (see FIG. 10) is caused to be displayed. Due to this, the user can cause the printer 100 to perform the DL print using the SC information after confirming the file, etc. registered in the past. On the other hand, in the case where the SC type is "to folder", the screens SR5 to SR7 (see FIG. 10) are displayed when performing a DL print using the SC information. Consequently, when performing the DL print, since the file and the print setting (further, the number of copies) are selected by the user, the confirmation screen is not caused to be displayed. Therefore, the user does not need to perform confirmation, thus improving user convenience. Moreover, in a modification, a confirmation screen may be displayed even in the case where the SC type is "to folder".

Further, in the case where the SC type is "to folder", when registering the SC information; the screen SR12 (see FIG. 9) for selecting a folder is displayed, and when performing a DL print using this SC information, the screens SR5, SR6, SR7 for selecting the three items: file, number of copies, and print setting (see "SC2" of FIG. 10) are displayed. Consequently, in the case where the SC type is "to folder", when performing registration of the SC information and performance of the DL print in combination, four items are selected in total, that is a combination of one item being the folder and the aforementioned three items. On the other hand, in the case where the SC type is "to print setting", when performing registration of the SC information, the screens SR12, SR15, SR7 (see FIG. 9) for selecting the three items: folder, file, and print setting, are displayed. Consequently, the four items of the case where the SC type is "to folder" include the above-mentioned three items of the case where the SC type is "to print setting". Notably, in the case where the SC type is "to print setting", when performing a DL print, the screen SR6 for selecting the number of copies (see "SC1" of FIG. 10) is further displayed. Consequently, when performing registration of the SC information and performance of the DL print in combination, the same four items are selected regardless of whether the SC type is "to folder" or "to print setting".

(Effects of Present Embodiment)

According to the present embodiment, the mediation server 200 can register, in the SC information table 222 (S440 of FIG. 6), the SC information including the file ID indicating the image file. Consequently, in the case of obtaining an SC performing request indicating use of this SC information from the printer 100 (S516 of FIG. 7), the mediation server 200 can cause the printer 100 to print the image represented by the image file identified by the file ID (YES in S540 of FIG. 7, S120 to S136 of FIG. 4) even if the user is not made to perform selection of an image file. Therefore, user convenience can be increased.

Further, according to the present embodiment, the communication system 2 comprising the printer 100 and the mediation server 200 can register, in the SC information table 222 (S440 of FIG. 6), the SC information including the file ID indicating the image file. Consequently, in the case where an operation for selecting the SC name "SC1" corresponding to this SC information is performed (S514 of FIG. 7), the communication system 2 can perform a print of the image identified by the file ID even if the user is not made to perform selection of that image file (YES in S540 of FIG. 7, S120 to S136 of FIG. 4). Therefore, user convenience can be increased.

(Correspondence Relationship)

The combination of the printer 100 and the mediation server 200 is an example of "printer system". The operation of S214 of FIG. 5 and the operation of S74A of FIG. 3 are examples of "shortcut registering operation". The registration requests of S216 and S249 are examples of "shortcut request". The screen SR11 of FIG. 9 is an example of "type selection screen". The SC type "to print setting" is an example of "first type of shortcut". The folder list of S270 of FIG. 5, the file list of S390 of FIG. 6, and the print condition list of S410 are examples of "M pieces of display data". The folder ID of S276 of FIG. 5, the file ID of S400 of FIG. 6, and the print setting of S416 are examples of "M pieces of selection data". The three screens SR12, SR15, SR7 of FIG. 9 are examples of "M pieces of selection screens" and "L1 pieces of selection screens". The screen SR15 and the screen SR7, of FIG. 9, and the screen SR6 of FIG. 10 are an example of "first file selection screen", "setting selection screen", "number selection screen", respectively. The file ID of S400 and the print setting of S416, of FIG. 6, and the number of copies of S548 of FIG. 7 are an example of "first file selection data", "setting selection data", "first number selection data", respectively.

The SC information registered in S440 of FIG. 6 is an example of "first shortcut information" and "shortcut information". The operation for selecting the SC button indicating the SC name "SC1" (S514 of FIG. 7) is an example of "using operation", and the SC performing request of S516 of FIG. 7 in response to that operation is an example of "first using request" and "using request". The print request S130 of FIG. 4 via YES in S540 of FIG. 7 is an example of "first print instruction".

The SC type "to folder" is an example of "second type of shortcut". The screen SR12 of FIG. 9 is an example of "K1 pieces of selection screens". The folder ID of S276 of FIG. 5 is an example of "K1 pieces of selection data". SR5 to SR7 of FIG. 10 are examples of "K2 pieces of selection screens". The file ID of S104, the number of copies of S104, and the print setting of SI 16, of FIG. 4, via NO in S540 of FIG. 7, are examples of "K2 pieces of selection data", and the file ID is an example of "third file selection data". The SC information registered in S300 of FIG. 5 is an example of "second shortcut information". The SC performing request of S516 of FIG. 7 in response to the operation for selecting the SC button indicating the SC name "SC2" (S514 of FIG. 7) is an example of "second using request". The print request of S130 of FIG. 4 via NO in S540 of FIG. 7 is an example of "third print instruction".

The operation of S54 of FIG. 3 is an example of "execution operation". The function name "DL print" of S56 of FIG. 3 is an example of "print request". The folder list of S70 of FIG. 3, and the file list of S90, the number of copies display data of S90, and the print condition list of S110, of FIG. 4, are examples of "N pieces of display data". The four screens SR4 to SR7 of FIG. 8 are examples of "N pieces of selection screens". The three screens SR4, SR5, SR7 of FIG. 8 are examples of "L2 pieces of selection screens". The screen SR5 and the screen SR6 of FIG. 8 are an example of "second file selection screen" and "number selection screen", respectively. The folder ID of S76 of FIG. 3, and the file ID of S104, the number of copies of S104, and the print setting of S116, of FIG. 4, are examples of "N pieces of selection data". The file ID of S104 and the number of copies of S104, of FIG. 4, are an example of "second file selection data" and "second number selection data", respectively. The print instruction of S130 of FIG. 4 which is performed subsequently to FIG. 3 is an example of "second print instruction".

(Modification 1)

In the above embodiment, the SC information is registered in the database 220 in the mediation server 200 (see table 222 of FIG. 2). Instead of this, the SC information may be registered in a database in a server configured separately from the mediation server 200. Further, the SC information may be registered in the memory 134 in the printer 100. For example, the CPU 232 may register the SC information in the memory 134 in the printer 100 in S442 without registering the SC information in S440 of FIG. 6. In this case, in S516 of FIG. 7, the CPU 132 may supply an SC performing request which further includes the SC information to the mediation server 200. In the present modification, the memory 134 in the printer 100 is an example of "database". Generally speaking, the "database" may be provided, or may not be provided, in the print mediation server.

(Modification 2)

The printer 100 may comprise a program for using each of the APIs corresponding to each of the SP servers 300, 400. In the above embodiment, respective communications (e.g., S60, S62 of FIG. 3, etc.) are performed between the mediation server 200 and the SP server 300 but, instead, the printer 100 may perform these communications with the SP server 300. Further, the memory 134 of the printer 100 may comprise the database 220 in which the SC information is registered. Further, even without obtaining, from the mediation server 200, data for displaying the screens SR1 to SR7, SR11 to SR16, SR20, SR21, the printer 100 may display the aforementioned screens by using the respective information included in the tables 138, 140, 222 in the memory 134, and the information obtained by communication with the SP server 300. In the present modification, the printer 100 can perform the normal DL print, the registration of the SC information, and the DL print using the SC information, without using the mediation server 200. That is, the mediation server 200 can be omitted. Generally speaking, "printer system" may be configured only by the printer 100.

(Modification 3)

Instead of supplying the folder list to the printer 100, the CPU 232 may, for example, in S70 of FIG. 3, generate screen data representing the folder screen SR4 by using the folder list, and supply the screen data to the printer 100. In this case, if the obtained screen data is supplied, as is, to the display unit 104, the CPU 132 can cause the display unit 104 to display the screen SR1 without needing to generate the screen data by using the template data. The same applies to the other screens SR2, etc.

(Modification 4)

The SP server 300 may store only files, without storing folders. In this case, the respective processes related to selecting a folder (e.g., S60 to S76 of FIG. 3, etc.) and the screens SR4, SR12 (see FIG. 8, FIG. 9) can be omitted. Further, when performing a DL print, the printer 100 may use a predetermined default number of copies and print setting. In this case, the respective processes related to selecting the number of copies and print setting (e.g., S110 to S116 of FIG. 4, etc.) and the screens SR6, SR7 (see FIG. 8 to FIG. 10) can be omitted. In the present modification, the screen SR5 of FIG. 8, and the screen SR15 of FIG. 9 are examples of "N pieces of selection screens" and "M pieces of selection screens", respectively, and "M" and "N" are 1. Generally speaking, "M" and "N" may be any integer of 1 or more.

(Modification 5)

In the above embodiment, in the case of the SC type "to print setting", the screens SR12, SR15, SR7 of FIG. 9 are sequentially displayed, and the three items (i.e., folder, file, print setting) are sequentially selected. Instead, in the case of the SC type "to print setting", the CPU 232 may cause the screens SR12, SR15, SR7 of FIG. 9 to be displayed together in one screen in the printer 100, and to obtain the selection results of the folder, file, and print setting in the one screen. In the present modification, the combination of folder, file, and print setting is an example of one item.

(Modification 6)

Instead of the SC type "to print setting", an SC type "to file" may be used. In this case, S410 to S416 of FIG. 6 can be omitted. Then, in S440, the CPU 232 registers the SC information which does not include a print setting in the database 220. In this case, when performing a DL print using this SC information, the CPU 232 causes the printer 100 to display the print condition screen SR7, and obtains the print setting from the printer 100. Then, the CPU 232 supplies a print instruction using this SC information and the obtained print setting to the printer 100. That is, "M pieces of selection screens" may not include the setting selection screen.

(Modification 7)

Instead of the SC type "to folder", the SC type "to file" may be used. In this case, in S278 of FIG. 5 it is determined whether the SC type is "to print setting" (NO in S278) or "to file" (YES in S278). Then, in the case of YES in S278, S380 to S400 of FIG. 6 are performed, and then S280 to S304 of FIG. 5 are performed. In S300, the CPU 232 registers SC information which includes the file ID and does not include the print setting, in the database 220. In the present modification, the SC type "to print setting" and the SC type "to file" are examples of "first type of shortcut" and "second type of shortcut", respectively. That is, "K1 pieces of selection screens" may include the file selection screen, and "K2 pieces of selection screens" may not include the file selection screen. Further, in another way of thinking, the SC type "to file", and the SC type "to print setting" are examples of "first type of shortcut" and "second type of shortcut", respectively. That is, "K 1" may be "M" or more.

(Modification 8)

In addition to the SC type "to print setting" and the SC type "to folder", an SC type "print setting only" may be further adopted. That is, three or more shortcuts may be adopted. In a case where the SC type "print setting only" is selected, the CPU 232 causes the printer 100 to display the screen SR7 without displaying the screens SR12, SR15 of FIG. 9, and registers, in the database 220, SC information which includes the print setting. In this case, when performing a DL print using this SC information, the CPU 232 causes the printer 100 to display the folder screen, the file screen, and the number of copies screen, obtains the respective selection results from the printer 100 and, using this SC information and the obtained respective selection results, supplies a print instruction to the printer 100. In the present modification, the SC type "print setting only" is an example of "second type of shortcut". That is, "K2" may be "M" or more.

(Modification 9)

S250 to S256 of FIG. 5 can be omitted. In this case, after S276 has been performed, the process proceeds to S380 of FIG. 6 without performing S278 to S304.

(Modification 10)

The printer 100 may be unable to perform a normal DL print. In this case, the respective processes of FIG. 3 and FIG. 4 can be omitted.

(Modification 11)

For example, the screen SR10 of FIG. 8 may not include the registration button. In this case, after causing the printer 100 to display the screens SR0 to SR7 and obtaining the respective selection results, the CPU 232 may cause the printer 100 to display a screen for selecting one of execution of DL print, and registration of SC information. Then, in a case where the execution of DL print is selected in the screen, the CPU 232 may obtain a print request from the printer 100, and cause the printer 100 to perform a DL print. Further, in a case where the registration of SC information is selected in the screen, the CPU 232 may obtain a registration request from the printer 100, and register the SC information. That is, "shortcut request" may be obtained before obtaining the "M pieces of selection data", as in the above embodiment, or may be obtained after obtaining the "M pieces of selection data", as in the present modification.

(Modification 12)

In the embodiment described above, the CPUs 132, 232 of the printer 100 and the mediation server 200 implement each process in FIG. 3 to FIG. 7 by performing processes in accordance with software. Instead, at least one process of the processes in FIG. 3 to FIG. 7 may be implemented by hardware such as a logic circuit.

What is claimed is:

1. A non-transitory computer-readable recording medium storing computer-readable instructions for a print mediation server, the computer-readable instructions, when executed by a processor of the print mediation server, causing the print mediation server to perform:
   causing a printer to display M pieces (the M being an integer of 1 or more) of selection screens for selecting M pieces of items relating to printing, each of the M pieces of selection screens including choices for each of the M pieces of items, the M pieces of selection screens including a first file selection screen for selecting an image file from among one or more image files stored in a storage server;
   obtaining each of M pieces of selection data indicating a result which was selected from the choices in a corresponding selection screen among the M pieces of selection screens, the M pieces of selection data including a first file selection data indicating a first image file which was selected in the first file selection screen;
   registering first shortcut information including each of the M pieces of selection data indicating the result which was selected from the choices in the corresponding selection screen among the M pieces of selection screens in a database in a case where a shortcut registration request is obtained from the printer and the M pieces of selection data are obtained;
   causing the printer to display a shortcut icon after the first shortcut information was registered in the database;
   obtaining a first use request indicating a use of the first shortcut information from the printer in a case where the shortcut icon which is displayed in the printer is selected after the first shortcut information was registered in the database; and
   supplying a first print instruction to the printer by using the M pieces of selection data included in the first shortcut information which was registered in the database so as to cause the printer to print a first image represented by the first image file, without causing the printer to display the first file selection screen, after the first use request was obtained from the printer.

2. The non-transitory computer-readable recording medium as in claim 1, wherein
   the M pieces of selection screens further include a setting selection screen for selecting a print setting from among print conditions which are available to the printer,
   the M pieces of selection data further include setting selection data indicating a print setting which was selected in the setting selection screen,
   the first shortcut information further includes the setting selection data, and
   the supplying of the first print instruction to the printer is performed so as to cause the printer to print the first image according to the print setting.

3. The non-transitory computer-readable recording medium as in claim 1, wherein
   the causing of the printer to display the M pieces of selection screens is performed in a case where the shortcut registration request is obtained from the printer, and
   the computer-readable instructions, when executed by the processor, cause the print mediation server to further perform:
   in a case where a print request which does not indicate a use of shortcut information is obtained from the printer, causing the printer to display N pieces (the N being an integer of 1 or more) of selection screens for selecting N pieces of items relating to printing, the N pieces of selection screens including a second file selection screen for selecting an image file from among the one or more image files;
   obtaining N pieces of selection data indicating results which were selected in the N pieces of selection screens, the N pieces of selection data including second file selection data indicating a second image file which was selected in the second file selection screen; and
   supplying a second print instruction to the printer by using the N pieces of selection data so as to cause the printer to print a second image represented by the second image file in a case where the N pieces of selection data are obtained.

4. The non-transitory computer-readable recording medium as in claim 3, wherein
   the M pieces of selection screens do not include a number-of-copies selection screen for selecting a number of copies to be printed,
   the computer-readable instructions, when executed by the processor, cause the print mediation server to further perform:
   causing the printer to display the number-of-copies selection screen after the first use request was obtained; and
   obtaining first number-of-copies selection data indicating a first number of copies to be printed which was selected in the number-of-copies selection screen,
   in a case where the first use request is obtained and the first number-of-copies selection data is obtained, the supplying of the first print instruction is performed by using the M pieces of selection data included in the first shortcut information and the first number-of-copies selection data so as to cause the printer to print the first image onto print media having a number of sheets that corresponds to the first number of copies,
   the N pieces of selection screens further include the number-of-copies selection screen,
   the N pieces of selection data further include second number-of-copies selection data indicating a second number of copies to be printed which was selected in the copy number selection screen, and
   the supplying of the second print instruction to the printer is performed by using the N pieces of selection data so as to cause the printer to print the second image onto print medium having a number of sheets that corresponds to the second number of copies.

5. The non-transitory computer-readable recording medium as in claim 3, wherein
   the causing of the printer to display the M pieces of selection screens is performed such that the first file selection screen is displayed by the printer in a state where only one file can be selected,
   the causing of the printer to display the N pieces of selection screens is performed such that the second file selection screen is displayed by the printer in a state where a plurality of files can be selected, and
   in a case where the second file selection data indicating a plurality of the second image files which was selected in the second file selection screen is obtained from the printer, the supplying of the second print instruction to the printer is performed so as to cause the printer to print a plurality of the second images represented by the plurality of the second image files.

6. The non-transitory computer-readable recording medium as in claim 3, wherein
the causing of the printer to display the M pieces of selection screens is performed such that L1 pieces (the L1 being an integer equal to L) of selection screens for selecting L (the L being an integer of 2 or more and of the M or less) pieces of items among the M pieces of selection screens are sequentially displayed according to a predetermined order, and
the causing of the printer to display the N pieces of selection screens is performed such that L2 pieces (the L2 being an integer equal to the L) of selection screens for selecting the L pieces of items among the N pieces of selection screens are sequentially displayed according to the predetermined order.

7. The non-transitory computer-readable recording medium as in claim 1,
wherein the computer-readable instructions, when executed by the processor, cause the print mediation server to further perform:
causing the printer to display a type selection screen for selecting one type of shortcut from among a plurality of types of shortcut including a first type of shortcut and a second type of shortcut in a case where the shortcut registration request is obtained,
in a case where first type selection data indicating that the first type of shortcut which was selected in the type selection screen is obtained from the printer,
the M pieces of selection screens are displayed by the printer;
the M pieces of selection data are obtained from the printer; and
the first shortcut information including the M pieces of selection data is registered in the database, and
the computer-readable instructions, when executed by the processor, cause the print mediation server to further perform:
in a case where second type selection data indicating that the second type of shortcut which was selected in the type selection screen is obtained from the printer, causing the printer to display K1 pieces (the K1 being an integer of 1 or more) of selection screens for selecting K1 pieces of items relating to printing, the K1 pieces of selection screens being different from the M pieces of selection screens at least partially;
obtaining K1 pieces of selection data indicating results which were selected in the K1 pieces of selection screens;
registering second shortcut information including the K1 pieces of selection data in the database in a case where the K1 pieces of selection data are obtained; and
in a case where a second use request indicating a use of the second shortcut information is obtained from the printer after the second shortcut information was registered in the database, supplying a third print instruction to the printer by using the K1 pieces of selection data included in the second shortcut information in the database so as to cause the printer to print a third image represented by a third image file.

8. The non-transitory computer-readable recording medium as in claim 7, wherein
the computer-readable instructions, when executed by the processor, cause the print mediation server to further perform:
causing the printer to display K2 pieces (the K2 being an integer of 1 or more) of selection screens for selecting K2 pieces of items relating to printing in the case where the second use request is obtained; and
obtaining K2 pieces of selection data indicating results which were selected in the K2 pieces of selection screens, and
in a case where the K2 pieces of selection data are obtained from the printer, the supplying of the third print instruction is performed by using the K1 pieces of selection data included in the second shortcut information in the database and the K2 pieces of selection data so as to cause the printer to print the third image represented by the third image file.

9. The non-transitory computer-readable recording medium as in claim 8, wherein
the K1 pieces of selection screens do not include a file selection screen for selecting an image file from among the one or more image files,
the K2 pieces of selection screens include a third file selection screen for selecting an image file from among the one or more image files, and
the K2 pieces of selection data include third file selection data indicating the third image file which was selected in the third file selection screen.

10. The non-transitory computer-readable recording medium as in claim 8, wherein (K1+K2) pieces of items which are a combination of the K1 pieces of items and the K2 pieces of items include the M pieces of items.

11. The non-transitory computer-readable recording medium as in claim 8, wherein each of the K1 and the K2 is an integer less than the M.

12. The non-transitory computer-readable recording medium as in claim 7, wherein the computer-readable instructions, when executed by the processor, cause the print mediation server to further perform:
causing the printer to display a confirmation screen indicating each of items for a print of the first image by using the M pieces of selection data included in the first shortcut information in a case where the first use request is obtained,
wherein a confirmation screen indicating each of items for a print of the third image is not displayed by the printer in a case where the second use request is obtained.

13. The non-transitory computer-readable recording medium as in claim 1, wherein the computer-readable instructions, when executed by the processor, cause the print mediation server to further perform:
inquiring of the storage server whether or not the first image file is stored in the storage server by using the first file selection data included in the first shortcut information in a case where the first use request is obtained; and
causing the printer to display an error screen indicating that a print of the first image is impossible in a case where a first inquiry result indicating that the first image file is not stored in the storage server is obtained from the storage server,
wherein in a case where a second inquiry result indicating that the first image file is stored in the storage server is obtained from the storage server, the supplying of the first print instruction to the printer is performed so as to cause the printer to print the first image.

14. A printer system comprising:
a display unit;
an operation unit;
a database;
a print engine;

a processor; and
a memory configured to store computer-readable instructions therein, the computer-readable instructions, when executed by the processor, causing the printer system to perform:
  causing the display unit to display M pieces (the M being an integer of 1 or more) of selection screens for selecting M pieces of items relating to printing, each of the M pieces of selection screens including choices for each of the M pieces of items, the M pieces of selection screens including a first file selection screen for selecting an image file from among one or more image files stored in a storage server;
  registering shortcut information in the database, the shortcut information including each of M pieces of selection data indicating a result which was selected via the operation unit from the choices in a corresponding selection screen among the M pieces of selection screens, the M pieces of selection data including first file selection data indicating a first image file which was selected in the first file selection screen; and
  causing the display unit to display a shortcut icon after the shortcut information was registered in the database; and
  causing the print engine to print a first image represented by the first image file by using the M pieces of selection data included in the shortcut information in the database, without causing the display unit to display the first file selection screen, in a case where the shortcut icon which is displayed in the display unit is selected via the operation unit after the shortcut information was registered in the database.

15. The printer system as in claim 14, wherein
the causing of the display unit to display the M pieces of selection screens is performed in a case where a shortcut registering operation is performed onto the operation unit,
the computer-readable instructions, when executed by the processor, cause the printer system to further perform:
  in a case where an execution operation relating to execution of printing is performed onto the operation unit, causing the display unit to display N pieces (the N being an integer of 1 or more) of selection screens for selecting N pieces of items relating to printing, the N pieces of selection screens including a second file selection screen for selecting an image file from among the one or more image files; and
  in a case where N pieces of selection data indicating results which were selected via the operation unit in the N pieces of selection screens, causing the print engine to print a second image represented by a second image file by using the N pieces of selection data, the N pieces of selection data including second file selection data indicating the second image file which was selected in the second file selection screen.

16. The printer system as in claim 15, comprising a printer and a print mediation server,
wherein the printer comprises:
  the display unit;
  the operation unit;
  the print engine;
  a first processor; and
  a first memory configured to store first computer-readable instructions therein, the first computer-readable instructions, when executed by the first processor, causing the printer to perform:
    supplying of a shortcut registration request to the print mediation server in the case where the shortcut registering operation is performed onto the operation unit;
    obtaining M pieces of display data for displaying the M pieces of selection screens from the print mediation server in response to supplying the shortcut registration request to the print mediation server;
    causing the display unit to display the M pieces of selection screens by using the M pieces of display data;
    supplying each of the M pieces of selection data indicating a result which was selected via the operation unit from the choices in the corresponding selection screen among the M pieces of selection screens to the print mediation server;
    causing the display unit to display the shortcut icon after the M pieces of selection data was supplied to the print mediation server;
    supplying a use request indicating a use of the shortcut information to the print mediation server in the case where the shortcut icon is selected via the operation unit;
    causing the print engine to print the first image in a case where a first print instruction is obtained from the print mediation server in response to supplying the use request to the print mediation server;
    supplying a print request which does not indicate a use of shortcut information to the print mediation server in the case where the execution operation is performed onto the operation unit;
    obtaining N pieces of display data for displaying the N pieces of selection screens from the print mediation server in response to supplying the print request to the print mediation server;
    causing the display unit to display the N pieces of selection screens by using the N pieces of display data;
    supplying the N pieces of selection data indicating results which were selected via the operation unit in the N pieces of selection screens to the print mediation server; and
    causing the print engine to print the second image in a case where a second print instruction is obtained from the print mediation server in response to supplying the N pieces of selection data to the print mediation server,
wherein the print mediation server comprises:
  the database;
  a second processor; and
  a second memory configured to store second computer-readable instructions therein, the second computer-readable instructions, when executed by the second processor, causing the print mediation server to perform:
    supplying the M pieces of display data to the printer in a case where the shortcut registration request is obtained from the printer;
    obtaining the M pieces of selection data from the printer;
    registering the shortcut information including the M pieces of selection data in the database in a case where the M pieces of selection data are obtained;

supplying the first print instruction by using the M pieces of selection data included in the shortcut information in the database in a case where the use request is obtained from the printer;

supplying the N pieces of display data to the printer in a case where the print request is obtained from the printer;

obtaining the N pieces of selection data from the printer; and supplying the second print instruction to the printer by using the N pieces of selection data in a case where the N pieces of selection data are obtained.

* * * * *